US012748358B2

(12) United States Patent
Shino et al.

(10) Patent No.: US 12,748,358 B2
(45) Date of Patent: Sep. 29, 2026

(54) TONER AND TONER PRODUCTION METHOD

(71) Applicant: CANON KABUSHIKI KAISHA, Tokyo (JP)

(72) Inventors: Megumi Shino, Chiba (JP); Takeshi Hashimoto, Ibaraki (JP); Gaku Sato, Chiba (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 469 days.

(21) Appl. No.: 18/543,153

(22) Filed: Dec. 18, 2023

(65) Prior Publication Data

US 2024/0219854 A1 Jul. 4, 2024

(30) Foreign Application Priority Data

Dec. 26, 2022 (JP) ................................. 2022-207914
Nov. 15, 2023 (JP) ................................. 2023-194259

(51) Int. Cl.
*G03G 9/087* (2006.01)
*G03G 9/08* (2006.01)

(52) U.S. Cl.
CPC ......... *G03G 9/08728* (2013.01); *G03G 9/081* (2013.01); *G03G 9/0821* (2013.01); *G03G 9/08782* (2013.01)

(58) Field of Classification Search
CPC ............. G03G 9/0825; G03G 9/08711; G03G 9/08797
See application file for complete search history.

(56) References Cited

U.S. PATENT DOCUMENTS

| | | | |
|---|---|---|---|
| 9,057,970 | B2 | 6/2015 | Ida |
| 9,152,088 | B1 | 10/2015 | Kobori |
| 9,348,247 | B2 | 5/2016 | Ida |
| 9,348,253 | B2 | 5/2016 | Kanno |
| 9,417,540 | B2 | 8/2016 | Hashimoto |
| 9,436,112 | B2 | 9/2016 | Iwasaki |
| 9,540,483 | B2 | 1/2017 | Ida |
| 9,651,883 | B2 | 5/2017 | Hama |
| 9,665,026 | B2 | 5/2017 | Iwasaki |
| 9,696,644 | B2 | 7/2017 | Ida |
| 9,897,934 | B2 | 2/2018 | Tamura |
| 10,012,920 | B2 | 7/2018 | Shibata |
| 10,036,970 | B2 | 7/2018 | Kanno |
| 10,078,281 | B2 | 9/2018 | Ida |
| 10,082,743 | B2 | 9/2018 | Hama |
| 10,088,765 | B2 | 10/2018 | Miyakai |
| 10,146,146 | B2 | 12/2018 | Komatsu |
| 10,175,595 | B2 | 1/2019 | Onozaki |
| 10,197,936 | B2 | 2/2019 | Onozaki |
| 10,203,619 | B2 | 2/2019 | Yamashita |
| 10,228,629 | B2 | 3/2019 | Tamura |
| 10,274,851 | B2 | 4/2019 | Hashimoto |
| 10,353,312 | B2 | 7/2019 | Kamae |
| 10,401,748 | B2 | 9/2019 | Hashimoto |
| 10,423,086 | B2 | 9/2019 | Hama |
| 10,451,986 | B2 | 10/2019 | Sano |
| 10,451,990 | B2 | 10/2019 | Kamae |
| 10,474,049 | B2 | 11/2019 | Onozaki |
| 10,514,624 | B2 | 12/2019 | Tamura |
| 10,564,560 | B2 | 2/2020 | Onozaki |
| 10,599,060 | B2 | 3/2020 | Kanno |
| 10,656,545 | B2 | 5/2020 | Kamae |
| 10,775,710 | B1 | 9/2020 | Kamae |
| 10,859,931 | B2 | 12/2020 | Hashimoto |
| 10,877,386 | B2 | 12/2020 | Murayama |
| 10,969,705 | B2 | 4/2021 | Shirayama |
| 11,029,617 | B2 | 6/2021 | Chimoto |
| 11,131,938 | B2 | 9/2021 | Murayama |
| 11,131,939 | B2 | 9/2021 | Hama |
| 11,181,848 | B2 | 11/2021 | Ochi |
| 11,624,986 | B2 | 4/2023 | Kanno |
| 11,662,670 | B2 | 5/2023 | Hama |
| 11,675,283 | B2 | 6/2023 | Kamae |
| 11,714,362 | B2 | 8/2023 | Kanno |
| 11,762,307 | B2 | 9/2023 | Tamura |
| 11,809,131 | B2 | 11/2023 | Kamae |
| 11,835,873 | B2 | 12/2023 | Hashimoto |
| 11,914,325 | B2 | 2/2024 | Hashimoto |
| 2014/0308611 | A1 | 10/2014 | Shimano |
| 2018/0059564 | A1 | 3/2018 | Miura |
| 2021/0181647 | A1 | 6/2021 | Hashimoto |
| 2021/0181650 | A1 * | 6/2021 | Hama ............... G03G 9/08731 |

(Continued)

FOREIGN PATENT DOCUMENTS

| | | | |
|---|---|---|---|
| JP | 2014-130243 | A | 7/2014 |
| JP | 2014-142632 | A | 8/2014 |

(Continued)

OTHER PUBLICATIONS

Translation of JP 2020-160202.*

*Primary Examiner* — Peter L Vajda
(74) *Attorney, Agent, or Firm* — VENABLE LLP

(57) ABSTRACT

A toner comprises a toner particle that contains a binder resin having a crystalline resin and an amorphous resin, and a wax, wherein a matrix-domain structure made up of a matrix including the crystalline resin, and domains including the amorphous resin, is present in a cross-sectional observation of the toner, the crystalline resin has a specific monomer unit, in a differential curve, which is obtained through differentiation of a temperature-storage elastic modulus curve by temperature, with temperature being a horizontal axis and a common logarithm Log G' of a storage elastic modulus G' being a vertical axis as obtained in a viscoelasticity measurement of the toner, the differential curve has specific minimal values P1 and P2 within specific temperature ranges, and has storage elastic moduli G' at the temperatures of the minimal values P1 and P2 lie in respective specific ranges.

12 Claims, No Drawings

(56) References Cited

U.S. PATENT DOCUMENTS

| | | | |
|---|---|---|---|
| 2021/0356878 | A1 | 11/2021 | Mizuguchi |
| 2022/0107573 | A1 | 4/2022 | Akiyama |
| 2022/0128916 | A1 | 4/2022 | Yoshida |
| 2022/0187728 | A1 | 6/2022 | Miura |
| 2022/0197163 | A1 | 6/2022 | Kajihara |
| 2022/0197166 | A1 | 6/2022 | Chimoto |
| 2022/0197174 | A1 | 6/2022 | Kajihara |
| 2022/0236654 | A1 | 7/2022 | Watanabe |
| 2022/0236655 | A1 | 7/2022 | Kanno |
| 2022/0236656 | A1 | 7/2022 | Kanno |
| 2022/0299901 | A1 | 9/2022 | Murata |
| 2022/0299902 | A1 | 9/2022 | Abe |
| 2022/0326630 | A1 | 10/2022 | Hashimoto |
| 2022/0342335 | A1 | 10/2022 | Ochi |
| 2022/0404727 | A1 | 12/2022 | Ueda |
| 2022/0413406 | A1 | 12/2022 | Shino |
| 2023/0086689 | A1 | 3/2023 | Kanno |
| 2023/0152725 | A1 | 5/2023 | Ochi |
| 2023/0305419 | A1 | 9/2023 | Watanabe |
| 2023/0314972 | A1 | 10/2023 | Hashimoto |
| 2024/0004324 | A1 | 1/2024 | Ochi |
| 2024/0061356 | A1 | 2/2024 | Kanno |

FOREIGN PATENT DOCUMENTS

| | | | | |
|---|---|---|---|---|
| JP | 2018-31986 | A | 3/2018 | |
| JP | 2020-160202 | * | 10/2020 | ............. G03G 9/087 |
| JP | 2021-182032 | A | 11/2021 | |
| JP | 2022-69299 | A | 5/2022 | |
| JP | 2022-94915 | A | 6/2022 | |
| JP | 2022-149313 | A | 10/2022 | |

* cited by examiner

TONER AND TONER PRODUCTION METHOD

BACKGROUND OF THE INVENTION

Field of the Invention

The present disclosure relates to a toner that is used in electrophotographic systems, electrostatic recording systems, electrostatic printing systems, and toner jet systems, and relates to a toner production method.

Description of the Related Art

Recent years have witnessed the need for an increase in added values, in terms of higher productivity, higher image quality and higher stability, of electrophotographic devices such as full-color printers and full-color copiers.

In order to achieve high productivity it is important to accomplish faster toner melting in a fixing process. Specifically, by using a crystalline resin having a sharp melt property, as a main component of a binder resin of the toner, it becomes possible to elicit better low-temperature fixability than in a toner having an amorphous resin as a main component.

For instance Japanese Patent Application Publication No. 2014-130243 proposes a toner that accomplishes both low-temperature fixability and heat-resistant storability, through the use of an acrylate resin having crystallinity in side chains. However, it has been found that toners which utilize crystalline resins having low-temperature fixability exhibit low strength at normal temperature, and fixed images of the toner are vulnerable towards scraping and scratching.

Therefore, Japanese Patent Application Publication No. 2014-142632 proposes a toner which, through the use of a binder resin that utilizes concomitantly a matrix of a crystalline vinyl resin and domains of an amorphous resin, allows for fixing at low temperature, such that, by virtue of the domain structure, images are obtained that withstand external forces such as scraping and scratching.

SUMMARY OF THE INVENTION

Meanwhile, the performance required from electrophotographic devices is becoming more exacting year by year, and there is a demand for obtaining stably print articles of high image quality even in the case of mass print output, at high-speed and for an extended period of time, in various environments. One phenomenon that detracts from the quality of print articles is fusion of toner to the surface of a photosensitive member drum, which gives rise to the occurrence of image density non-uniformity, blank dots and/or image smearing.

As in Japanese Patent Application Publication No. 2014-142632, a toner having low-temperature fixability exhibits drops in viscosity when heated up on account of frictional heat at a cleaning section of a photosensitive member drum, in the case of mass print output, at high speed and for an extended period of time, in a high-temperature, high-humidity environment. As a result, the toner readily fuses to the surface of the photosensitive member drum, and accordingly such toners have still room for further improvement.

At least one aspect of the present disclosure provides a toner exhibiting excellent low-temperature fixability, such that fusion of the toner to a drum can be suppressed, while delivering high-quality print articles, even in the case of mass print output, at high speed and for an extended period of time, in a high-temperature, high-humidity environment. Further, at least one aspect of the present disclosure provides a toner production method, for producing the above toner.

At least one aspect of the present disclosure is directed to a toner comprising a toner particle comprising a binder resin comprising a crystalline resin and an amorphous resin, and a wax, wherein a matrix-domain structure made up of a matrix including the crystalline resin, and domains including the amorphous resin, is present in a cross-sectional observation of the toner under a transmission electron microscope, the crystalline resin has a first monomer unit represented by Formula (1) below;

in a differential curve, which is obtained through differentiation of a temperature-storage elastic modulus curve by temperature, with temperature as a horizontal axis and a common logarithm Log G' of a storage elastic modulus G' as a vertical axis as obtained in a viscoelasticity measurement of the toner, the differential curve has a minimal value P1 in a range of 50 to 70° C., the minimal value P1 being −0.50 to −0.20, and the differential curve has a minimal value P2 in a range of 80 to 120° C., the minimal value P2 being −0.20 to −0.03;

the storage elastic modulus G' of the toner at the temperature of the minimal value P1 is $5.0\times10^5$ to $2.0\times10^7$ Pa; and the storage elastic modulus G' of the toner at the temperature of the minimal value P2 is $1.0\times10^2$ to $1.0\times10^4$ Pa;

(1)

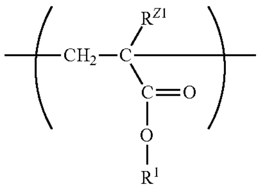

in Formula (1), $R^{Z1}$ represents a hydrogen atom or a methyl group, and $R^1$ represents an alkyl group having 18 to 36 carbon atoms.

At least one aspect of the present disclosure is directed to a method for producing the above toner, the method comprising:

a melt-kneading step of melt-kneading a mixture that contains the binder resin having the crystalline resin and the amorphous resin, and the wax; and an annealing step of holding a melt-kneaded product obtained after the melt-kneading step at a temperature of 40 to 60° C., for 30 minutes or longer.

At least one aspect of the present disclosure can provide a toner exhibiting excellent low-temperature fixability, such that fusion of the toner to a drum can be suppressed, while delivering high-quality print articles, even in the case of mass print output, at high speed and for an extended period of time, in a high-temperature, high-humidity environment. Further, at least one aspect of the present disclosure can provide a toner production method, for producing the above toner.

Further features of the present invention will become apparent from the following description of exemplary embodiments.

DESCRIPTION OF THE EMBODIMENTS

In the present disclosure, the terms "from XX to YY" and "XX to YY", which indicate numerical ranges, mean numerical ranges that include the lower limits and upper limits that are the end points of the ranges.

In the present disclosure, a (meth)acrylic acid ester means an acrylic acid ester and/or a methacrylic acid ester.

In cases where numerical ranges are indicated incrementally, upper limits and lower limits of the numerical ranges can be arbitrarily combined.

The term "monomer unit" describes a reacted form of a monomeric material in a polymer. For example, one carbon-carbon bonded section in a principal chain of polymerized vinyl monomers in a polymer is given as one unit. A vinyl monomer can be represented by the following formula (Z):

(Z)

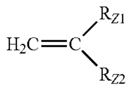

in formula (Z), $R_{Z1}$ represents a hydrogen atom or alkyl group (preferably a alkyl group having 1 to 3 carbon atoms, or more preferably a methyl group), and $R_{Z2}$ represents any substituent.

A crystalline resin is a resin exhibiting a clear endothermic peak in differential scanning calorimetry (DSC) measurement.

The toner of the present disclosure will be explained in detail next.

The present disclosure relates to a toner comprising a toner particle comprising a binder resin comprising a crystalline resin and an amorphous resin, and a wax, wherein a matrix-domain structure made up of a matrix including the crystalline resin, and domains including the amorphous resin, is present in a cross-sectional observation of the toner under a transmission electron microscope, the crystalline resin has a first monomer unit represented by Formula (1) below;

in a differential curve, which is obtained through differentiation of a temperature-storage elastic modulus curve by temperature, with temperature as a horizontal axis and a common logarithm Log G' of a storage elastic modulus G' as a vertical axis as obtained in a viscoelasticity measurement of the toner, the differential curve has a minimal value P1 in a range of 50 to 70° C., the minimal value P1 being −0.50 to −0.20, and the differential curve has a minimal value P2 in a range of 80 to 120° C., the minimal value P2 being −0.20 to −0.03;

the storage elastic modulus G' of the toner at the temperature of the minimal value P1 is $5.0\times10^5$ to $2.0\times10^7$ Pa; and the storage elastic modulus G' of the toner at the temperature of the minimal value P2 is $1.0\times10^2$ to $1.0\times10^4$ Pa;

(1)

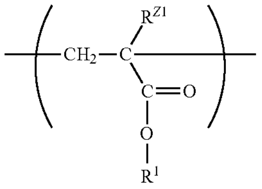

in Formula (1), $R^{Z1}$ represents a hydrogen atom or a methyl group, and $R^1$ represents an alkyl group having 18 to 36 carbon atoms.

As a result of diligent research the inventors found that the above problems can be solved through the presence, in the toner, of a matrix-domain structure made up of a matrix that includes a crystalline resin, and of domains that include an amorphous resin, and through control of the viscoelasticity of the toner so as to lie in a specific range.

The inventors surmise the following concerning the underlying reason why the above problem is solved.

When the binder resin of the toner is a crystalline resin having numerous alkyl groups, such as the monomer unit represented by Formula (1), the wax is readily inter-soluble with the crystalline resin which is the binder resin. As a result, viscoelasticity sharply decreases at the melting point of the binder resin, and in consequence the toner is prone to fuse onto the surface of a photosensitive member drum due to frictional heat at a cleaning section of the photosensitive member drum upon long-term use in a high-temperature, high-humidity environment.

By contrast, the toner according to the present has the following characteristics. A differential curve is obtained through differentiation of a temperature-storage elastic modulus curve by temperature, with temperature as the horizontal axis and a common logarithm Log G' of the storage elastic modulus G' as the vertical axis, and obtained in a viscoelasticity measurement of the toner. In the differential curve there exists a minimal value P1 in the range of 50 to 70° C., the minimal value P1 being −0.50 to −0.20. There further exists a minimal value P2 in the range of 80 to 120° C., the minimal value P2 being −0.20 to −0.03.

The storage elastic modulus G' of the toner at the temperature of the minimal value P1 is $5.0\times10^5$ to $2.0\times10^7$ Pa, while the storage elastic modulus G' of the toner at the temperature of the minimal value P2 is $1.0\times10^2$ to $1.0\times10^4$ Pa.

The temperature of 50 to 70° C. corresponds to a temperature region at a time of a rise in temperature on account of frictional heat at the cleaning section of the photosensitive member drum. Therefore, a feature wherein the above minimal value P1 lies in the range of 50 to 70° C. and the minimal value P1 is −0.50 to −0.20 signifies that the viscoelasticity of the toner, when heated up on account of frictional heat at the cleaning section of the photosensitive member drum, can decrease by a certain extent.

The temperature of 80 to 120° C. corresponds to the temperature in the vicinity of a fixing nip. Therefore, a feature wherein the minimal value P2 above lies in the range of 80 to 120° C. and the minimal value is −0.20 to −0.03, signifies that the viscoelasticity of the toner can decrease in the vicinity of the fixing nip.

Therefore, the feature of having both the minimal value P1 and minimal value P2 signifies that, in the temperature-storage elastic modulus curve, the viscoelasticity of the toner decreases stepwise within a specific range, in respective temperature regions, at the time of heating up on account of frictional heat at the cleaning section of the photosensitive member drum and at the time of passage through the fixing nip. By contrast, toners having a conventional binder resin that is a crystalline resin lack the minimal value P2, due to the fact that the viscoelasticity of the toner decreases sharply at the melting point of the crystalline resin.

In the above differential curve, the minimal value P1 is preferably −0.40 to −0.20, more preferably −0.35 to −0.25. The minimal value P2 is preferably from −0.15 to −0.05, more preferably from −0.13 to −0.07.

When the minimal value P1 exceeds −0.20, the toner fails to exhibit a sharp melt property, and the low-temperature fixability of the toner worsens.

When the minimal value P2 exceeds −0.03, the toner does not melt sufficiently at the fixing nip portion, and low-temperature fixability decreases. When by contrast the minimal value P2 is lower than −0.20, viscosity drops excessively at the fixing nip portion, which gives rise to hot offset and defective fixing.

The storage elastic modulus G' of the toner at the temperature of P1 is $5.0\times10^5$ to $2.0\times10^7$ Pa, preferably $1.0\times10^6$ to $8.0\times10^6$ Pa. The storage elastic modulus G' at the temperature of P2 is $1.0\times10^2$ to $1.0\times10^4$, preferably from $1.0\times10^3$ to $9.0\times10^3$.

When the storage elastic modulus G' at the temperature of P1 is lower than $5.0\times10^5$ Pa, viscosity is excessively low at the cleaning section of the photosensitive member drum, and as a result toner melt adhesion is prone to occur. Low-temperature fixability decreases by contrast when the storage elastic modulus G' at the temperature of P1 exceeds $2.0\times10^7$ Pa.

When the storage elastic modulus G' at the temperature of P2 is lower than $1.0\times10^2$ Pa, viscosity at the fixing nip portion is excessively low, which gives rise to hot offset and defective fixing. Low-temperature fixability decreases by contrast when the storage elastic modulus G' at the temperature of P2 exceeds $1.0\times10^4$ Pa.

The temperature at the minimal value P1 (temperature at minimal value) is preferably 55.0 to 65.0° C., more preferably from 58.0 to 62.0° C.

The temperature at the minimal value P2 (temperature at minimal value) is preferably 85.0 to 100.0° C., more preferably 90.0 to 95.0° C.

An explanation follows next on an example of a toner that can bring out the above viscoelasticity.

Preferably, for instance the crystalline state of the wax is controlled, for the purpose of obtaining the above toner. Through an increase in the degree of crystallinity of the wax in the toner, the wax preserves an appropriate crystalline state, and elicits a filler effect, in the toner. The inventors have found that when the toner has amorphous resin domains, these amorphous resin domains interact with a crystalline resin matrix, thanks to which the filler effect of the wax is pronounced.

As a result, the toner can preserve appropriate viscoelasticity even when the temperature exceeds the melting point of the binder resin, for instance on account of frictional heat at the cleaning section of the photosensitive member drum. In consequence, the toner is not prone to fuse onto the surface of the photosensitive member drum, even when heated up on account of frictional heat at the cleaning section of the photosensitive member drum, during extended use in a high-temperature, high-humidity environment. Moreover, the temperature in the vicinity of the fixing nip is high, above the melting point of the wax; as a result, the filler effect no longer acts, the viscoelasticity of the toner decreases sharply, and thus the toner exhibits excellent low-temperature fixability.

Therefore, in order for the toner to exhibit the minimal values P1 and P2, preferably the toner has domains of an amorphous resin, a matrix of a crystalline resin, and a wax; also, a degree of crystallinity of the wax contained in the toner is controlled.

The minimal value P1 is manifested in a drop in viscosity derived from melting of the crystalline resin. Therefore, the value of P1 can be lowered by making the melting behavior sharper. Herein it is for instance effective to increase the addition amount of crystalline resin, or to increase the amount of crystalline component in the crystalline resin. The minimal value P1 can be increased by mitigating the influence that melting of the crystalline resin exerts on toner viscosity. For instance, this may involve reducing the addition amount of crystalline resin.

The minimal value P2 can be reduced by for instance reinforcing the temperature dependence of the meltability of the wax and of the crystalline resin. In other words, the value of P2 can be reduced by performing annealing in order to prevent melting of the crystalline resin, before the temperature at P2, and by bringing SP values closer to each other, for the purpose of improving meltability after the temperature at P2. In order to make the filler effect of wax more pronounced it is also effective to add a domain-forming amorphous resin or other fillers, to reduce the value of P2.

The minimal value P2 can be increased for instance by making the wax and the crystalline resin inter-soluble in each other, or by broadening the melting behavior of the wax with respect to temperature.

The storage elastic modulus G' at the temperature of the minimal value P1 can be controlled for instance on the basis of the addition amount of the crystalline resin and the amount of crystalline component in the crystalline resin, and also on the basis of the monomer units of the crystalline resin and on the type of the amorphous resin. The storage elastic modulus G' at the temperature of the minimal value P1 can also be controlled on the basis of the size of the amorphous resin domains, and through addition of a filler. In order to increase the storage elastic modulus G' at the temperature of the minimal value P1 it is effective to reduce the addition amount of crystalline resin, increase the addition amount of amorphous resin, reduce domain size, and/or to add a filler. It is also effective to control the inter-soluble state between the wax and the crystalline resin at the temperature of the minimal value P1.

On the premise that the minimal value P2 is brought about by resorting to the above-mentioned means, the storage elastic modulus G' at the temperature of the minimal value P2 can be controlled on the basis of the types and addition amounts of wax, crystalline resin and amorphous resin. In particular, the storage elastic modulus G' at the temperature of the minimal value P2 can be lowered by increasing the compatibility between the wax and the crystalline resin at the temperature of the minimal value P2.

Herein, ΔH(T) denotes a total endothermic quantity J/g per 1 g of wax, derived from the wax, in an endothermic quantity measurement of the toner using a differential scanning calorimeter. Further, ΔH(W) denotes a total endothermic quantity J/g per 1 g of wax, derived from the wax, in a measurement of an endothermic quantity of the wax.

Such being the case, preferably there holds $0.70\leq\Delta H(T)/\Delta H(W)\leq0.90$, and more preferably there holds $0.75\leq\Delta H(T)/\Delta H(W)\leq0.85$.

The ratio ΔH(T)/ΔH(W) denotes the rate of change in degree of crystallinity between the stand-alone wax and of the wax after having been made into a toner, and is an indicator of the inter-soluble state of the wax with the binder resin. When ΔH(T)/ΔH(W) is 0.70 or higher, the amount of wax that is inter-soluble with the binder resin is appropriate, and a more sufficient filler effect is readily achieved. When by contrast ΔH(T)/ΔH(W) is 0.90 or lower, the wax does not undergo complete phase separation from the binder resin, and the foregoing interact more readily with each other.

The value of ΔH(T)/ΔH(W) can be increased for instance by making the SP values of the binder resin and of wax more dissimilar from each other, or by raising the melting point of the wax. Conversely, ΔH(T)/ΔH(W) can be reduced for instance by bringing the SP values of the binder resin and wax closer to each other, or by lowering the melting point of the wax.

Further, ΔH(T)/ΔH(W) can also be controlled on the basis of kneading conditions and annealing conditions. In particular, ΔH(T)/ΔH(W) can be increased through annealing.

Crystalline Resin

The crystalline resin has a first monomer unit represented by Formula (1) below (hereafter also simply referred to as first monomer unit). The crystalline resin is preferably a crystalline vinyl resin.

The content ratio of the first monomer unit in the crystalline resin is preferably 30.0 mass % or higher, relative to the mass of all monomer units in the crystalline resin. Within the above ranges, the crystalline resin exhibits sufficient crystallinity, and affords better low-temperature fixability.

(1)

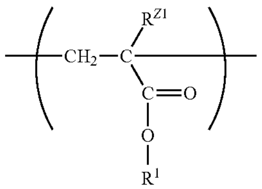

In Formula (1), $R^{Z1}$ represents a hydrogen atom or a methyl group, and $R^1$ represents an alkyl group having 18 to 36 carbon atoms (C18 to C36 alkyl group). Further, $R^1$ is preferably a C18 to C30 alkyl group. Preferably, the alkyl group has a linear structure.

The first monomer unit has a C18 to C36 alkyl group represented by $R^1$ in a side chain, such that the crystalline resin readily exhibits crystallinity by virtue of this moiety.

When the content ratio of the first monomer unit in the crystalline resin is 30.0 mass % or higher, crystallinity is developed more readily, and low-temperature fixability is yet better. The content ratio of the first monomer unit in the crystalline resin is preferably 30.0 to 80.0 mass %, more preferably 40.0 to 75.0 mass %, and yet more preferably 45.0 to 65.0 mass %.

Arguably thanks to the presence of a structure exhibiting crystallinity in the side chains, the crystalline vinyl resin exhibits excellent charge retention in a high-temperature high-humidity environment, as compared with crystalline polyesters which are conventionally known crystalline resins. By virtue of the fact that the crystalline vinyl resin has thus a structure exhibiting crystallinity in side chains, interactions with the below-described wax are more pronounced, and the storage elastic modulus G' at the temperature of P1 tends to be higher The first monomer units are monomer units derived from at least one monomer (first polymerizable monomer) selected from the group consisting of (meth)acrylic acid esters having an alkyl group having 18 to 36 carbon atoms.

Examples of (meth)acrylic acid esters having an alkyl group having 18 to 36 carbon atoms include (meth)acrylic acid esters having a linear C18 to C36 alkyl group [stearyl (meth)acrylate, nonadecyl (meth)acrylate, eicosyl (meth) acrylate, heneicosanyl (meth)acrylate, behenyl (meth)acrylate, lignoceryl (meth)acrylate, ceryl (meth)acrylate, octacosyl (meth)acrylate, myricyl (meth)acrylate and dotriacontanyl (meth)acrylate)], and (meth)acrylic acid esters having a branched alkyl group having 18 to 36 carbon atoms [for instance 2-decyltetradecyl (meth)acrylate].

Preferred among the foregoing is at least one selected from the group consisting of (meth)acrylic acid esters having a linear alkyl group having 18 to 36 carbon atoms, from the viewpoint of the low-temperature fixability of the toner. Yet more preferable is at least one selected from the group consisting of (meth)acrylic acid esters having a linear alkyl group having 18 to 30 carbon atoms. Yet more preferable is at least one selected from the group consisting of linear stearyl (meth)acrylate and linear behenyl (meth)acrylate.

The monomers that form the first monomer units may be used singly as one type; alternatively, two or more types thereof may be used concomitantly.

The crystalline vinyl resin may contain monomer units other than the first monomer units.

Examples of polymerizable monomers that form other monomer units other than the first monomer units include those exemplified below. The polymerizable monomers that form other monomer units may be used singly or in combinations of two or more types thereof.

Such other monomer units other than the first monomer units can be roughly divided into second monomer units represented by Formula (2) below (hereafter also simply referred to as "second monomer units", third monomer units represented by Formula (3) below (hereafter also simply referred to as "third monomer units"), and monomer units other than the first monomer units, second and third monomer units.

(2)

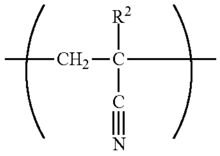

(3)

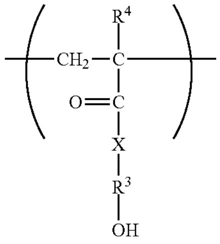

In Formula (2), $R^2$ represents a hydrogen atom or a methyl group.

In Formula (3), X represents —O— or —NH— (preferably —O—), $R^4$ represents a hydrogen atom or a methyl group, and $R^3$ represents a C2 to C6 (preferably C2 to C4, and more preferably a C2 or C3) alkylene.

A second monomer unit has a polar group directly bonded to the main chain of the crystalline vinyl resin. Examples of polymerizable monomers that form the second monomer unit include acrylonitrile and methacrylonitrile.

The third monomer units have a polar hydroxy group at a position spaced from the main chain. Examples of polymerizable monomers that form the third monomer units include the following polymerizable monomers.

2-hydroxyethyl (meth)acrylate, 2-hydroxypropyl (meth) acrylate, 2-hydroxyethylamide (meth)acrylate and 2-hydroxypropylamide (meth)acrylate.

Examples of polymerizable monomers that form monomer units, other than the first, second and third monomer units include the following polymerizable monomers.

Styrene and derivatives thereof such as styrene and o-methylstyrene, as well as (meth)acrylic acid esters such a methyl (meth)acrylate, n-butyl (meth)acrylate, t-butyl (meth)acrylate and 2-ethylhexyl (meth)acrylate.

Unsaturated monoolefins such as ethylene, propylene, butylene and isobutylene; and unsaturated polyenes such as butadiene and isoprene.

Aromatic divinyl compounds; diacrylate compounds having an alkyl chain bridge; diacrylate compounds having an alkyl chain bridge containing an ether bond; diacrylate compounds having a bridge in the form of a chain containing an aromatic group and an ether bond; polyester-type diacrylates; and multifunctional crosslinking agents. Examples of aromatic divinyl compounds include divinylbenzene and divinylnaphthalene.

Examples of the above diacrylate compounds having an alkyl chain bridge include ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and compounds resulting from replacing the acrylate in the foregoing compounds with methacrylate.

Styrene is preferable herein as a polymerizable monomer that forms monomer units other than the first, second and third monomer units, since styrene tends to improve readily charging stability in high-temperature, high-humidity conditions.

The crystalline resin preferably has second monomer units, more preferably, the crystalline resin has at least two of monomer units selected from among the second monomer units, or has second monomer units and third monomer units, and yet more preferably, the crystalline resin has second monomer units and third monomer units. In these cases, the polymerizable monomers that form the second monomer units are preferably at least one selected from the group consisting of acrylonitrile and methacrylonitrile, and the polymerizable monomers that form the third monomer units are at least one selected from the group consisting of 2-hydroxyethyl (meth)acrylate and 2-hydroxypropyl (meth) acrylate.

By using such polymerizable monomers concomitantly it becomes possible to suppress fusion of toner to the drum, to obtain print articles of yet higher quality, and to bring out low-temperature fixability at a yet higher level, even in the case of mass print output, at high speed and for extended periods of time, in a high-temperature, high-humidity environment. The above presumably arises from the co-presence, in such a monomer structure, of a component of low SP value and of high compatibility with the wax, and a component of high SP value and of low compatibility with the wax.

Upon toner melting, the polar groups in the crystalline vinyl resin interact with each other on account of electric dipole interactions; as a result, the viscosity and elastic modulus of the toner increases as compared with a resin having no polar groups.

In the second monomer units a polar functional group is directly bonded to a main chain that contributes significantly to molecular mobility. After toner melting, therefore, the storage elastic modulus of the crystalline vinyl resin is higher than that of a crystalline vinyl resin having no polar groups directly bonded to the main chain of the resin.

By contrast, the third monomer units have a polar hydroxy group that is present off the main chain. After toner melting, therefore, the storage elastic modulus increases less readily as compared with a crystalline vinyl resin having a polar groups directly bonded to the main chain of the resin.

In a case where the second monomer unit and the third monomer unit are co-present, the storage elastic modulus of the toner is maintained at a proper level, and fusion of toner to the drum can be suppressed to a greater extent, print articles of yet higher quality can be obtained, and low-temperature fixability can be brought out a yet higher level, even when in the case of mass print output, at high-speed and for extended periods of time, in a high-temperature, high-humidity environment.

The content ratio of the second monomer unit in the crystalline resin is preferably 3.0 to 25.0 mass %, more preferably 5.0 to 20.0 mass %.

The content ratio of the third monomer unit in the crystalline resin is preferably 1.0 to 10.0 mass %, more preferably 3.0 to 7.0 mass %.

The content ratio of monomer units other than the first, second and third monomer units in the crystalline resin is preferably 10.0 to 60.0 mass %, more preferably 20.0 to 40.0 mass %.

When the crystalline vinyl resin is a vinyl-based resin, it the resin can be produced using the exemplified polymerizable monomers and a polymerization initiator. From the viewpoint of efficiency, the polymerization initiator is preferably used in an amount from 0.05 parts by mass to 10.00 parts by mass relative to 100.00 parts by mass of the polymerizable monomers.

Examples of the polymerization initiator include the following.

ketone peroxides such as 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobis isobutyrate, 1,1'-azobis(1-cyclohexanecarbonitrile), 2-carbamoylazoisobutyronitrile, 2,2'-azobis(2,4,4-trimethylpentane), 2-phenylazo-2,4-dimethyl-4-methoxyvaleronitrile, 2,2'-azobis(2-methylpropane), methyl ethyl ketone peroxide, acetylacetone peroxide and cyclohexanoneperoxide; as well as 2,2-bis(tert-butyl peroxy)butane, tert-butylhydroperoxide, cumene hydroperoxide, 1,1,3,3-tetramethylbutylhydroperoxide, di-tert-butyl peroxide, tert-butylcumyl peroxide, dicumyl peroxide, α,α'-bis(tert-butyl peroxyisopropyl) benzene, isobutyl peroxide, octanoyl peroxide, decanoyl peroxide, lauroyl peroxide, 3,5,5-trimethylhexanoyl peroxide, benzoyl peroxide, m-trioyl peroxide, diisopropyl peroxydicarbonate, di-2-ethylhexyl peroxydicarbonate, di-n-propyl peroxydicarbonate, di-2-ethoxyethyl peroxycarbonate, dimethoxyisopropyl peroxydicarbonate, di(3-methyl-3-methoxybutyl) peroxycarbonate, acetylcyclohexylsulfonyl peroxide, tert-butyl peroxyacetate, tert-butyl peroxyisobutyrate, tert-butyl peroxyneodecanoate, tert-butyl peroxy-2-ethylhexanoate, tert-butyl peroxylaurate, tert-butyl peroxybenzoate, tert-butyl peroxyisopropyl carbonate, di-tert-butyl peroxyisophthalate, tert-butyl peroxyallyl carbonate, tert-amyl peroxy-2-ethylhexanoate, di-tert-butyl peroxyhexahydroterephthalate and di-tert-butyl peroxyazelate.

From the viewpoint of charging stability, the acid value of the crystalline resin used as the binder resin is preferably from 0 mgKOH/g to 100 mgKOH/g, more preferably from 10 mgKOH/g to 60 mgKOH/g, yet more preferably from 15 mgKOH/g to 50 mgKOH/g and particularly preferably from 20 mgKOH/g to 30 mgKOH/g.

Similarly, the hydroxyl value is preferably from 0 mgKOH/g to 100 mgKOH/g, more preferably from 0 mgKOH/g to 75 mgKOH/g, yet more preferably from 0 mgKOH/g to 20 mgKOH/g, and particularly preferably OmgKOH/g.

Amorphous Resin

In addition to a crystalline resin, the toner contains an amorphous resin, as a binder resin. The content ratio of the amorphous resin in the binder resin is not particularly limited, but is preferably 25 mass % to 65 mass %, more preferably 30 mass % to 50 mass %, and yet more preferably 35 mass % to 45 mass %.

A known amorphous resin can be used as the amorphous resin. Examples thereof include the following.

Polyvinyl chloride, phenolic resins, natural resin-modified phenolic resins, natural resin-modified maleic acid resins, polyvinyl acetate, silicone resins, polyester resins, polyurethane resins, polyamide resins, furan resins, epoxy resins, xylene resins, polyvinyl butyral, terpene resins, coumarone-indene resins, petroleum resins and vinyl-based resins.

Among the foregoing the toner contains preferably at least one resin selected from the group consisting of a hybrid resin in which a vinyl-based resin and a polyester resin are bonded to each other, a polyester resin and a vinyl-based resin.

An amorphous polyester resin is yet more preferred herein. That is, the amorphous resin is preferably an amorphous polyester resin. By using an amorphous polyester resin, the degree of crystallinity of the wax is raised, and the storage elastic modulus of the toner is maintained at a yet more proper level. As a result, it becomes possible to suppress fusion of toner to the drum, to obtain print articles of yet higher quality, and to bring out low-temperature fixability at a yet higher level, even in the case of mass print output, at high speed and for extended periods of time, in a high-temperature, high-humidity environment.

Polyester resins that are ordinarily used in toners can be suitably used herein as the amorphous polyester resin. Examples of the monomers used in the above polyester resin include polyhydric alcohols (dihydric, trihydric or higher alcohols), and polyvalent carboxylic acids (divalent, trivalent or higher carboxylic acids) and acid anhydrides or lower alkyl esters thereof.

Examples of the above polyhydric alcohols include those set out below.

Examples of dihydric alcohols include the following bisphenol derivatives.

Polyoxypropylene (2.2)-2,2-bis(4-hydroxyphenyl)propane, polyoxypropylene (3.3)-2,2-bis(4-hydroxyphenyl) propane, polyoxyethylene (2.0)-2,2-bis(4-hydroxyphenyl) propane, polyoxypropylene (2.0)-polyoxyethylene (2.0)-2,2-bis(4-hydroxyphenyl)propane, polyoxypropylene (6)-2,2-bis(4-hydroxyphenyl)propane and the like.

Other polyhydric alcohols include ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, tritrimethylolpropane and 1,3,5-trihydroxymethylbenzene.

These polyhydric alcohols can be used singly or in combinations of a plurality thereof.

Examples of the above polyvalent carboxylic acids include those below.

Examples of divalent carboxylic acids include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid and isooctylsuccinic acid, as well as anhydrides and lower alkyl esters of these acids. Preferably among the foregoing there is used maleic acid, fumaric acid, terephthalic acid, n-dodecenylsuccinic acid or adipic acid.

Examples of trivalent or higher carboxylic acids, and anhydrides and lower alkyl esters thereof, include the following.

1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylene carboxypropane, 1,2,4-cyclohexanetricarboxylic acid, tetra (methylene carboxy)methane, 1,2,7,8-octane tetracarboxylic acid, pyromellitic acid and Empol trimer acids, as well as acid anhydrides and lower alkyl esters thereof.

Preferred among the foregoing is 1,2,4-benzenetricarboxylic acid (trimellitic acid) or derivatives such as acid anhydrides thereof, since these are inexpensive and afford easy reaction control.

These polyvalent carboxylic acids can be used singly or in combinations of a plurality thereof.

The method for producing the polyester resin is not particularly limited, and a known method can be resorted to herein. For instance, a polyhydric alcohol and a polyvalent carboxylic acid described above are simultaneously charged, and are polymerized as a result of an esterification reaction or a transesterification reaction, and a condensation reaction, to produce a polyester resin. The polymerization temperature is not particularly limited, but lies preferably in the range from 180° C. to 290° C. For instance a polymerization catalyst such as a titanium-based catalyst, a tin-based catalyst, zinc acetate, antimony trioxide or germanium dioxide can be used in polymerization of polyester resins.

The polyester resin used in the amorphous resin is preferably obtained through condensation polymerization using at least one from among a titanium-based catalyst and a tin-based catalyst.

The amorphous polyester resin is preferably a condensation polymer of a polyhydric alcohol and a polyvalent carboxylic acid. Preferably, the polyhydric alcohol contains at least one selected from the group consisting of bisphenol derivatives. The polyvalent carboxylic acid preferably contains at least one selected from the group consisting of fumaric acid, succinic acid, terephthalic acid and adipic acid. Preferably, the polyvalent carboxylic acid includes trimellitic acid or an anhydride thereof.

Examples of vinyl resins used as amorphous resins include polymers of polymerizable monomers containing ethylenically unsaturated bonds. The term ethylenically unsaturated bond denotes a carbon-carbon double bond capable of undergoing radical polymerization, and may be for instance a vinyl group, a propenyl group, an acryloyl group or a methacryloyl group.

Examples of polymerizable monomers include the following.

Styrenic monomers such as styrene, o-methylstyrene, m-methylstyrene, p-methylstyrene, p-phenylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxy styrene, p-chlorostyrene, 3,4-dichlorostyrene, m-nitrostyrene, o-nitrostyrene, p-nitrostyrene;

acrylic acids and acrylic acid esters such as acrylic acid, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate and phenyl acrylate;

α-methylene aliphatic monocarboxylic acids and esters thereof, such as methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate;

as well as acrylonitrile, methacrylonitrile and acrylamide.

Further examples include acrylic acid esters or methacrylic acid esters such as 2-hydroxyethyl acrylate, 2-hydroxyethyl methacrylate, 2-hydroxypropyl methacrylate, as well as polymerizable monomers having a hydroxy group, such as 4-(1-hydroxy-1-methylbutyl) styrene and 4-(1-hydroxy-1-methylhexyl) styrene. The foregoing can be used singly or in combinations of a plurality of types thereof.

Among the foregoing there is preferably used a monomer that is a condensation product of a C6 to C22 alcohol and an acrylic acid or methacrylic acid such as n-octyl acrylate, dodecyl acrylate, 2-ethylhexyl acrylate, stearyl acrylate, n-octyl methacrylate, dodecyl methacrylate, 2-ethylhexyl methacrylate or stearyl methacrylate.

These monomers interact readily with C18 to C30 long-chain alkyl units in the crystalline vinyl resin, and allow properly increasing the viscoelasticity.

Besides the above resins, various polymerizable monomers that are amenable to vinyl polymerization may be used concomitantly, as needed, in the vinyl resin.

Examples of such polymerizable monomers include the following.

Unsaturated monoolefins such as ethylene, propylene, butylene and isobutylene; unsaturated polyenes such as butadiene and isoprene; vinyl halides such as vinyl chloride, vinylidene chloride, vinyl bromide and vinyl fluoride; vinyl esters such as vinyl acetate, vinyl propionate and vinyl benzoate; vinyl ethers such as vinyl methyl ether, vinyl ethyl ether and vinyl isobutyl ether; vinyl ketones such as vinyl methyl ketone, vinyl hexyl ketone and methyl isopropenyl ketone; N-vinyl compounds such as N-vinylpyrrole, N-vinylcarbazole, N-vinylindole and N-vinylpyrrolidone; vinylnaphthalenes; as well as polymerizable monomers having a carboxy group, for instance unsaturated dibasic acids such as maleic acid, citraconic acid, itaconic acid, alkenylsuccinic acids, fumaric acid and mesaconic acid; unsaturated dibasic anhydrides such as maleic anhydride, citraconic anhydride, itaconic anhydride and alkenylsuccinic anhydrides; half esters of unsaturated dibasic acids such as methyl maleate half ester, ethyl maleate half ester, butyl maleate half ester, methyl citraconate half ester, ethyl citraconate half ester, butyl citraconate half ester, methyl itaconate half ester, methyl alkenylsuccinate half esters, methyl fumarate half ester and methyl mesaconate half ester; unsaturated dibasic acid esters such as maleic acid dimethyl ester and fumaric acid dimethyl ester; acid anhydrides of α,β-unsaturated acids such as acrylic acid, methacrylic acid, crotonic acid and cinnamic acid; anhydrides of these α,β-unsaturated acids and lower fatty acids; alkenyl malonic acids, alkenyl glutaric acids and alkenyl adipic acids; as well as acid anhydrides of the foregoing, and monoesters of the foregoing.

As the case may require, the vinyl resin may be a polymer crosslinked with a crosslinking polymerizable monomer such as those exemplified below.

Examples of the crosslinking polymerizable monomer include the following.

Aromatic divinyl compounds; diacrylate compounds having an alkyl chain bridge; diacrylate compounds having an alkyl chain bridge containing an ether bond; diacrylate compounds having a bridge of a chain containing an aromatic group and an ether bond; polyester-type diacrylates; and multifunctional crosslinking agents.

Examples of aromatic divinyl compounds include divinylbenzene and divinylnaphthalene.

Examples of the above diacrylate compounds having an alkyl chain bridge include ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and compounds resulting from replacing the acrylate in the foregoing compounds with methacrylate.

The vinyl resin is preferably a polymer of polymerizable monomers including at least one selected from the group consisting of styrene, o-methylstyrene, m-methylstyrene, p-methylstyrene, p-phenylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, p-nitrostyrene, acrylic acid, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate, phenyl acrylate, methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, acrylonitrile, methacrylonitrile, acrylamide, 2-hydroxyethyl acrylate, 2-hydroxyethyl methacrylate, 2-hydroxypropyl methacrylate, 4-(1-hydroxy-1-methylbutyl)styrene and 4-(1-hydroxy-1-methylhexyl)styrene.

The vinyl resin may be a copolymer of at least one polymerizable monomer selected from the above group, and a monomer including at least one crosslinking polymerizable monomer selected from the group consisting of divinylbenzene, divinylnaphthalene, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, ethylene glycol dimethacrylate, 1,3-butylene glycol dimethacrylate, 1,4-butanediol dimethacrylate, 1,5-pentanediol dimethacrylate, 1,6-hexanediol dimethacrylate and neopentyl glycol dimethacrylate. The content ratio of the crosslinking monomer among the monomers may be set to from about 0.5 mass % to 5.0 mass %.

The vinyl resin may be a resin produced using a polymerization initiator. From the viewpoint of efficiency, the polymerization initiator may be used in an amount from 0.05 parts by mass to 10.00 parts by mass relative to 100.00 parts by mass of the polymerizable monomers. Examples of the polymerization initiator include the following.

ketone peroxides such as 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobis isobutyrate, 1,1'-azobis(1-cyclohexanecarbonitrile), 2-carbamoylazoisobutyronitrile, 2,2'-azobis(2,4,4-trimethylpentane), 2-phenylazo-2,4-dimethyl-4-methoxyvaleronitrile, 2,2'-azobis(2-methylpropane), methyl ethyl ketone peroxide, acetylacetone peroxide and cyclohexanoneperoxide; as well as 2,2-bis(tert-butyl peroxy)butane, tert-butylhydroperoxide, cumene hydroperoxide, 1,1,3,3-tetramethylbutylhydroperoxide, di-tert-butyl peroxide, tert-butylcumyl peroxide, dicumyl peroxide, α,α'-bis(tert-butyl peroxyisopropyl)benzene, isobutyl peroxide, octanoyl peroxide, decanoyl peroxide, lauroyl peroxide, 3,5,5-trimethylhexanoyl peroxide, benzoyl peroxide, m-trioyl peroxide, diisopropyl peroxydicarbonate, di-2-ethylhexyl peroxydicarbonate, di-n-propyl peroxydicarbonate, di-2-ethoxyethyl peroxycarbonate, dimethoxyisopropyl peroxydicarbonate, di(3-methyl-3-methoxybutyl)peroxycarbonate, acetylcyclohexylsulfonyl peroxide, tert-butyl peroxyacetate, tert-butyl peroxyisobutyrate, tert-butyl peroxyneodecanoate, tert-butyl peroxy-2-ethylhexanoate, tert-butyl peroxylaurate, tert-butyl peroxybenzoate, tert-butyl peroxyisopropyl carbonate, di-tert-butyl peroxyisophthalate, tert-butyl peroxyallyl carbonate, tert-amyl peroxy-2-ethylhexanoate, di-tert-butyl peroxyhexahydroterephthalate and di-tert-butyl peroxyazelate.

The same vinyl resins and polyester resins used as the above-described amorphous resin can be utilized herein as the vinyl resin and polyester resin that are used to form a hybrid resin in which the vinyl resin and the polyester resin are bonded to each other.

Examples of the method for producing a hybrid resin in which a vinyl-based resin and a polyester resin are bonded to each other include for instance a polymerization method that utilizes a compound (hereafter "bireactive compound") that can react with any of the monomers that generate both resins.

Bireactive compounds include compounds such as fumaric acid, acrylic acid, methacrylic acid, citraconic acid, maleic acid and dimethyl fumarate. Fumaric acid, acrylic acid and methacrylic acid are preferably used among the foregoing.

In a case where a hybrid resin is used in which a vinyl resin and a polyester resin are bonded to each other, the content ratio of the vinyl resin in the hybrid resin is preferably 10 mass % or more, 20 mass % or more, 40 mass % or more, 60 mass % or more or 80 mass % or more, and preferably 100 mass % or less, or 90 mass % or less.

From the viewpoint of charging stability, the acid value of the amorphous resin used as the binder resin is preferably from 0 mgKOH/g to 100 mgKOH/g, more preferably from 10 mgKOH/g to 60 mgKOH/g, yet more preferably from 15 mgKOH/g to 50 mgKOH/g, and particularly preferably from 20 mgKOH/g to 30 mgKOH/g.

Similarly, the hydroxyl value is preferably from 0 mgKOH/g to 100 mgKOH/g, more preferably from 10 mgKOH/g to 75 mgKOH/g, yet more preferably from 15 mgKOH/g to 70 mgKOH/g, and particularly preferably from 18 mgKOH/g to 60 mgKOH/g.

The binder resin in the toner contains a crystalline resin and an amorphous resin. In a cross-sectional observation of the toner using a transmission electron microscope there is observed a domain-matrix structure made up of a matrix that includes a crystalline resin and domains that include an amorphous resin.

By including thus a crystalline resin in the matrix, the binder resin in the toner exhibits as a result excellent low-temperature fixability. Thanks to the presence of an amorphous resin in the domains, those amorphous resin domains act accordingly as a filler. The crystallized wax and the domains in the matrix interact with each other, given that the toner particle has a domain-matrix structure. As a result, the toner can maintain a moderate viscoelasticity even when the melting point of the binder resin is exceeded, and thus the toner is less prone to fuse onto the surface of the photosensitive member drum, even when heated up on account of frictional heat at the cleaning section of the photosensitive member drum, during extended use in a high-temperature, high-humidity environment.

The toner particle can have a domain-matrix structure, through appropriate modification of the compositions of the crystalline resin and the amorphous resin.

In a cross-sectional observation of the toner under a transmission electron microscope, the number-average diameter of the domains is preferably 0.05 to 3.00 μm, more preferably 0.10 to 1.00 μm. Preferably, the number-average diameter of the domains lies within the above ranges, since in that case the amorphous resin acts readily as a filler at the time of toner melting, and readily interacts with a crystallized wax. As a result, the toner is less prone to fuse onto the surface of the photosensitive member drum, even when heated up on account of frictional heat at the cleaning section of the photosensitive member drum, when the toner is used for an extended time in a high-temperature, high-humidity environment.

The number-average diameter of the domains can be controlled for instance on the basis the composition of the monomers that make up the crystalline resin, the composition of the monomers that make up the amorphous resin, and the production conditions of the toner particle. Specifically, the number-average diameter of the domains can be increased for instance by widening the discrepancy between the SP values of the crystalline resin and of the amorphous resin, or by increasing the vigor with which the crystalline resin and the amorphous resin are kneaded during production. The number-average diameter of the domains can be reduced for instance by bringing the SP values of the crystalline resin and the amorphous resin closer to each other, or by reducing the vigor with which the crystalline resin and the amorphous resin are kneaded during production.

In a cross-sectional observation of the toner under a transmission electron microscope, preferably the ratio of domains relative to the combined surface area of matrix plus domains is 30 to 65 area %, more preferably 35 to 45 area %. Within the above ranges, viscosity can be made sufficiently low, and low-temperature fixability can be ensured, in a molten state at 80° ° C. to 120° C., while maintaining the strength of the toner, within a range of 50° C. to 70° C. The above area ratio can be controlled on the basis of the addition ratios of the crystalline resin and amorphous resin.

Other Resins

So long as the effect of the present disclosure is not impaired thereby, the binder resin may contain a resin other than the crystalline resin and amorphous resin described above, for instance with a view to improving pigment dispersibility. The content ratio of the crystalline resin and amorphous resin in the binder resin is preferably 80 to 100 mass %, more preferably 90 to 100 mass %.

Examples of the resin include the following.

Polyvinyl chloride, phenolic resins, natural resin-modified phenolic resins, natural resin-modified maleic acid resins, polyvinyl acetate, silicone resins, polyester resins, polyurethane resins, polyamide resins, furan resins, epoxy resins, xylene resins, polyvinyl butyral, terpene resins, coumarone-indene resins and petroleum-based resins.

Wax

The toner particle contains a wax. As the wax there may be selected and used an optimal wax in combination with a crystalline resin. Examples of the wax include the following.

Hydrocarbon-based waxes such as microcrystalline waxes, paraffin waxes and Fischer Tropsch waxes; oxides of hydrocarbon-based waxes, such as oxidized polyethylene waxes, and block copolymers thereof; waxes comprising mainly fatty acid esters, such as carnauba wax; and waxes obtained by partially or wholly deoxidizing fatty acid esters, such as deoxidized carnauba wax.

Further examples include the types listed below. Saturated straight chain fatty acids such as palmitic acid, stearic acid and montanic acid; unsaturated fatty acids such as brassidic acid, eleostearic acid and parinaric acid; saturated alcohols such as stearyl alcohol, aralkyl alcohols, behenyl alcohol, carnaubyl alcohol, ceryl alcohol and melissyl alcohol; polyhydric alcohols such as sorbitol; esters of fatty acids such as palmitic acid, stearic acid, behenic acid and montanic acid and alcohols such as stearyl alcohol, aralkyl alcohols, behenyl alcohol, carnaubyl alcohol, ceryl alcohol and melissyl alcohol; fatty acid amides such as linoleic acid amide, oleic acid amide and lauric acid amide; saturated fatty acid bisamides such as methylene bis-stearic acid amide, ethylene bis-capric acid amide, ethylene bis-lauric acid amide and hexamethylene bis-stearic acid amide; unsaturated fatty acid amides such as ethylene bis-oleic acid amide, hexamethylene bis-oleic acid amide, N,N'-dioleyladipic acid amide and N,N'-dioleylsebacic acid amide; aromatic bisamides such as m-xylene bis-stearic acid amide and N,N'-distearylisophthalic acid amide; fatty acid metal salts (commonly known as metal soaps) such as calcium stearate, calcium laurate, zinc stearate and magnesium stearate; waxes obtained by grafting vinyl monomers such as styrene and acrylic acid onto aliphatic hydrocarbon-based waxes; partial esters of fatty acids and polyhydric alcohols, such as behenic acid monoglyceride; and hydroxyl group-containing methyl ester compounds obtained by hydrogenating plant-based oils and fats.

The wax is preferably a hydrocarbon wax, more preferably a Fischer-Tropsch wax. The melting point of the wax is preferably 90° C. or higher, more preferably 90 to $10^{5°}$ C., and yet more preferably 90 to 95° C. When the wax has a hydrocarbon, the wax crystallizes readily in the toner and, moreover, the crystallized wax interacts readily with the crystalline resin having alkyl groups in side chains. Therefore, the toner is less prone to fuse onto the surface of the photosensitive member drum even if the toner heats up on account of frictional heat at the cleaning section of the photosensitive member drum when the toner is used for an extended time in a high-temperature, high-humidity environment.

The wax content is preferably 2.0 parts by mass to 30.0 parts by mass, more preferably 5.0 parts by mass to 20.0 parts by mass, and yet more preferably 7.0 parts by mass to 12.0 parts by mass, relative to 100 parts by mass of the binder resin.

In the toner, SP1 which is an SP value $(J/cm^3)^{0.5}$ of the crystalline resin, SP2 which is an SP value $(J/cm^3)^{0.5}$ of the amorphous resin and SP3 which is an SP value $(J/cm^3)^{0.5}$ of the wax preferably satisfy the expressions below.

$$2.5 \leq |SP2-SP1|$$

$$2.5 \leq |SP3-SP1|$$

The term SP value is an abbreviation of solubility parameter, the value of which serves as an indicator of solubility. Herein SP values are calculated in accordance with the method proposed by Fedors.

The units of SP value in the present disclosure are $(J/cm^3)^{0.5}$, which can be converted to $(cal/cm^3)^{0.5}$ units given that 1 $(cal/cm^3)^{0.5}=2.045\times10^3$ $(J/cm^3)^{0.5}$.

When the absolute difference between SP2 and SP1 is 2.5 or more in a toner having a matrix-domain structure, the domains become less inter-soluble with the matrix, and the filler effect of the domains is brought out more fully. Moreover, when the absolute difference between SP3 and SP1 is 2.5 or more, the wax becomes less inter-soluble with the matrix, and the wax is likely to crystallize sufficiently. Therefore, the viscoelasticity of the toner does not drop readily when the toner heats up on account of frictional heat at the cleaning section of the photosensitive member drum, during extended use in a high-temperature, high-humidity environment.

More preferably, $|SP2-SP1|$ is from 2.5 to 5.0.

More preferably, $|SP3-SP1|$ is from 2.5 to 4.0.

Herein SP1 is preferably 19.0 to 22.0, more preferably 19.0 to 21.0. Further, SP2 is preferably 22.0 to 26.0, more preferably 23.0 to 25.0. In turn, SP3 is preferably 16.0 to 18.0, more preferably 16.5 to 17.5.

Inorganic Filler Particles

Preferably, the toner particle contains inorganic filler particles. The content of the inorganic filler particles in the toner particle is preferably 5 to 20 parts by mass, and more preferably 5 to 15 parts by mass, relative to 100 parts by mass of the binder resin.

By satisfying the above range, the viscoelasticity of the toner can be further increased, when the temperature of the toner rises on account of frictional heat at the cleaning section of the photosensitive member drum, during extended use in a high-temperature, high-humidity environment, and thus the toner is less prone to fuse onto the drum surface.

The filler particles are preferably treated with a fatty acid. By being thus surface-treated with a fatty acid the filler particles interact, via the fatty acids, with the alkyl groups of the crystalline resin. As a result it becomes possible to increase the viscoelasticity of the toner when heated up on account of on account of frictional heat at the cleaning section of the photosensitive member drum, during extended use in a high-temperature, high-humidity environment.

Preferred inorganic filler particles that are internally added to the toner particles include silica, titanium oxide, aluminum oxide, metal titanate salts such as strontium titanate and calcium titanate, as well as calcium carbonate and kaolin. In particular, calcium carbonate and kaolin are preferred herein from the viewpoint of interactions with the crystalline resin.

The number-average diameter of the primary particles of the inorganic filler particles that are internally added to the toner particle is preferably 0.15 to 0.45 μm, more preferably 0.20 to 0.40 μm. The number-average diameter of the primary particles of the inorganic filler particles can be measured relying on known means such as scanning electron microscopy.

Colorant

The toner particle may contain a colorant, as needed. Examples of the colorant include the following.

Examples of black colorants include carbon black; and materials that are colored black through use of yellow colorants, magenta colorants and cyan colorants. The colorant may be a single pigment, but using a colorant obtained by combining a dye and a pigment and improving the clarity is more preferred from the perspective of full color image quality.

Examples of a pigment for a magenta toner include the following.

C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, 282; C. I. Pigment Violet 19; C. I. Vat Red 1, 2, 10, 13, 15, 23, 29, 35.

Examples of a dye for a magenta toner include the following.

Oil-soluble dyes such as C. I. Solvent Red 1, 3, 8, 23, 24, 25, 27, 30, 49, 81, 82, 83, 84, 100, 109, 121; C. I. Disperse Red 9; C. I. Solvent Violet 8, 13, 14, 21, 27; C. I. Disperse Violet 1, Basic dyes such as C. I. Basic Red 1, 2, 9, 12, 13, 14, 15, 17, 18, 22, 23, 24, 27, 29, 32, 34, 35, 36, 37, 38, 39, 40; C. I. Basic Violet 1, 3, 7, 10, 14, 15, 21, 25, 26, 27, 28.

Examples of a pigment for a cyan toner include the following.

C. I. Pigment Blue 2, 3, 15:2, 15:3, 15:4, 16, 17; C. I. Vat Blue 6; C. I. Acid Blue 45, a copper phthalocyanine pigment having a phthalocyanine skeleton substituted with 1 to 5 phthalimidomethyl groups.

Examples of a dye for a cyan toner include C. I. Solvent Blue 70.

Examples of a pigment for a yellow toner include the following.

C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, 185; C. I. Vat Yellow 1, 3, 20.

Examples of a dye for a yellow toner include C. I. Solvent Yellow 162.

These colorants can be used alone or in combination, or in the form of a solid solution. The colorant is selected from the viewpoint of hue angle, chroma, lightness, light fastness, OHP transparency and dispersibility in the toner. The content of the colorant is preferably 0.1 parts by mass to 30.0 parts by mass, relative to 100 parts by mass of the binder resin.

Charge Control Agent

The toner particle may contain a charge control agent if necessary. A well-known charge control agent can be used, but an aromatic carboxylic acid metal compound is particularly preferred from the perspectives of being colorless, toner charging speed being rapid, and being able to stably maintain a certain degree of charge quantity.

Examples of negative type charge control agents include metal salicylate compounds, metal naphthoate compounds, metal dicarboxylate compounds, polymer type compounds having a sulfonic acid or carboxylic acid in a side chain, polymer type compounds having a sulfonic acid salt or sulfonic acid ester in a side chain, polymer type compounds having a carboxylic acid salt or carboxylic acid ester in a side chain, boron compounds, urea compounds, silicon compounds and calixarenes.

The charge control agent may be internally or externally added to the toner particle. The content of the charge control agent is preferably 0.2 to 10.0 parts by mass, and more preferably 0.5 to 10.0 parts by mass, relative to 100 parts by mass of the binder resin.

The toner may contain an external additive. For instance, the toner may be obtained through external addition of an external additive to the toner particle. Inorganic fine particles such as silica, titanium oxide, aluminum oxide, or metal titanates are preferable herein as the external additive. The inorganic fine particles used as the external additive are preferably hydrophobized with a hydrophobic agent such as a silane compound, silicone oil, or a mixture thereof.

Inorganic fine particles having a BET specific surface area from 50 $m^2/g$ to 400 $m^2/g$ are preferred as an external additive for improving flowability; herein inorganic fine particles having a BET specific surface area from 10 $m^2/g$ to 50 $m^2/g$ are preferred, for the purpose of stabilizing durability. Inorganic fine particles having a BET specific surface area within the above ranges may be used concomitantly, with a view to improving flowability and stabilize durability. A known mixer such as a Henschel mixer can be used for mixing the toner particle and the external additive.

The content ratio of the external additive is preferably 0.1 to 10.0 parts by mass, more preferably from 2.0 to 7.0 parts by mass, relative to 100 parts by mass of the toner particle.

Developer

The toner can be used as a one-component developer, but is preferably mixed with a magnetic carrier and used as a two-component developer, in terms of obtaining stable images over long periods of time. Specifically, the developer is herein a two-component developer containing a toner and a magnetic carrier, such that the toner is the above-described toner.

Examples of magnetic carriers include generally known ones such as an iron powder or a surface-oxidized iron powder; metal particles of iron, lithium, calcium, magnesium, nickel, copper, zinc, cobalt, manganese, chromium, rare earths or the like, as well as alloy particles thereof and oxide particles thereof; magnetic bodies such as ferrite; and magnetic body-dispersed resin carriers (so-called resin carriers) containing one such magnetic body and a binder resin that holds the magnetic body in a dispersed state.

In a case where the toner is mixed with a magnetic carrier and used as a two-component developer, the content ratio of the toner in the two-component developer is preferably from 2.0 mass % to 15.0 mass %, more preferably from 4.0 mass % to 13.0 mass %.

Toner Production Method

The toner production method is not particularly limited, and a conventionally known method can be resorted to, such as suspension polymerization, emulsification aggregation, melt-kneading or dissolution suspension.

A preferred production method for producing a toner includes a melt-kneading step of obtaining a melt-kneaded product through melt-kneading of a toner composition that contains a binder resin containing a crystalline resin and an amorphous resin, and a wax, and a pulverization step of cooling and solidifying the melt-kneaded product, and pulverizing the resulting cooled solidified product, to yield a pulverized product. That is, the toner particle is preferably a melt-kneaded and pulverized toner particle.

The above production method allows readily obtaining, a matrix-domain structure made up of a matrix containing a crystalline resin and domains including an amorphous resin, through melt-kneading of a mixture having a controlled ratio of crystalline resin and amorphous resin.

Preferably, the toner production method includes

- a melt-kneading step of melt-kneading a mixture that contains a binder resin having a crystalline resin and an amorphous resin, and a wax; and
- an annealing step of holding the melt-kneaded product obtained after the melt-kneading step at a temperature of 40 to 60° C., for 30 minutes or longer.

An explanation follows next on a procedure for producing a toner in accordance with a melt-kneading pulverization method.

Starting Material Mixing Step

In a starting material mixing step, materials that make up the toner particle, for instance a binder resin containing a crystalline resin and an amorphous resin, plus a wax and, as needed, also other components such as a colorant and a charge control agent, are weighed in predetermined amounts, and are blended and mixed. Examples of mixing devices include a double cone mixer, a V-type mixer, a drum-type mixer, a Super mixer, a Henschel mixer, a Nauta mixer and Mechano Hybrid (by Nippon Coke & Engineering Co., Ltd.).

Melt-Kneading Step

The mixed materials are then melt-kneaded, to disperse the wax and so on in the binder resin containing the crystalline resin and the amorphous resin. A batch kneader such as a pressure kneader or Banbury mixer, or a continuous kneader, can be used in the melt-kneading step; herein, single-screw and twin-screw extruders have become mainstream extruders on account of their superiority in terms of allowing for continuous production. Specific examples include a KTK model twin-screw extruder (by Kobe Steel, Ltd.), a TEM model twin-screw extruder (by Toshiba Machine Co., Ltd.), PCM kneader (by Ikegai Corp.), a twin-screw extruder (by KCK Co.), Ko-kneader (by Buss AG) and Kneadex (by Nippon Coke & Engineering Co., Ltd.). The resin composition obtained by melt-kneading may then be rolled using for instance two rolls, and may be cooled for instance with water in a cooling step.

Melt-kneading in the melt-kneading step is preferably accomplished using a twin-screw extruder. The dispersion state of the crystalline resin and the amorphous resin, the number-average diameter of the domains and so forth can be controlled on the basis of for instance the kneading temperature and the screw rotational speed in the melt-kneading step.

The kneading temperature is preferably 110 to 140° C., more preferably 115 to 130° C. The screw rotational speed at the time of kneading is not particularly limited, so long as it can be modified as appropriate depending on the apparatus, but is preferably, for instance, 200 to 300 rpm.

Cooling Step

The means resorted to in the cooling process are not particularly limited. Examples include a method in which a kneaded product of the resin composition is rolled using a two-axis roller or drum, followed by cooling using a steel belt cooler (by Nippon Steel Conveyor Co., Ltd.), or a method in which the kneaded product is rolled, while being cooled, by a drum provided with a press roller and an internal cooling mechanism, such as a belt drum flaker (by Nippon Coke & Engineering Co., Ltd.). In the cooling step, rolling while under cooling is preferably accomplished using a belt drum flaker.

Pulverization Step

The cooled resin composition is then pulverized to a desired particle diameter in a pulverization step. In the pulverization step the resulting product is coarsely pulverized using a pulverizer such as a crusher, hammer mill or feather mill, and is thereafter finely pulverized using for instance a Kryptron system (by Kawasaki Heavy Industries, Ltd.), Super Rotor (by Nisshin Engineering Inc.) or Turbo Mill (by Freund-Turbo Corporation), or a pulverizer using an air jet system.

Classification Step

A toner particle may be then obtained thereafter through classification, as needed, classification using a sieving or classifying apparatus such as Elbow Jet (by Nittetsu Mining Co., Ltd.) which is an inertial classification system, or Turboplex (by Hosokawa Micron Corporation), TSP Separator (by Hosokawa Micron Corporation) or Faculty (by Hosokawa Micron Corporation) that rely on centrifugal classification.

External Addition Step

The obtained toner particle may be used, as-is, as the toner. A toner may then be obtained by externally adding an external additive to the surface of toner particle. The method involved in an external addition treatment may include blending a predetermined amount of various known external additives with a classified toner, and stirring and mixing the whole using an external addition apparatus in the form of a mixing device such as a double-cone mixer, a V-type mixer, a drum-type mixer, a Super mixer, a Henschel mixer, a Nauta mixer, Mechano Hybrid (by Nippon Coke & Engineering Co., Ltd.) or Nobilta (by Hosokawa Micron Corporation).

Annealing Step

Preferably, the melt-kneaded product obtained after the melt-kneading step is annealed, to promote crystal growth of wax in the toner. Annealing is preferably performed after the cooling step. By promoting thus crystal growth in the wax there is readily satisfied $0.70 \le \Delta H(T)/\Delta H(W) \le 0.90$.

Specifically, the melt-kneaded product obtained after the melt-kneading step is preferably held at a temperature of 40 to 60° C. for 30 minutes or longer (preferably, held for 30 to 120 minutes, and more preferably 40 to 60 minutes). More preferably, the temperature is maintained at 40 to 50° C. More preferably, annealing is performed after melt-kneading and prior to the pulverization step, from the viewpoint of controlling the state in which the wax is exposed on the toner particle surface.

Methods for measuring various physical properties of the toner and starting materials will be explained next.

Measurement of the Minimal Value P1, Minimal Value P2, and Storage Elastic Modulus G' of the Toner The measuring device used herein is a rotating-plate rheometer "ARES" (by TA INSTRUMENTS Inc.). The measurement sample that is used is a sample resulting from pressure-molding the toner (at 20 MPa for 30 seconds) into a disk shape having a diameter of 25 mm and a thickness of 2.0±0.3 mm, using a tablet molding machine in an environment at 25° C.

The sample is mounted on a parallel plate, and is shaped by being heated from room temperature (25° C.) up to 60° ° C. over 15 minutes; thereafter, the sample is cooled down to the measurement start temperature of viscoelasticity, whereupon the measurement is initiated, to measure complex viscosity. The sample is set at this time so that the initial normal force is 0. As described below, the influence of the normal force in subsequent measurements can be canceled by turning on an automatic tension adjustment (Auto Tension Adjustment ON).

Measurements are performed under the following conditions.

(1) A parallel plate having a diameter of 25 mm is used herein.

(2) The frequency is set to 6.28 rad/sec (1.0 Hz).

(3) The initial applied strain (Strain) is set to 1.0%.

(4) A measurement is performed at 40° ° C. to 150° ° C. at a Ramp Rate of 2.0° C./min. The measurement is performed under the following setting conditions in an automatic adjustment mode. The measurement is performed in an automatic strain adjustment mode (Auto Strain).

(5) Maximum strain (Max Applied Strain) is set to 40.0%.

(6) Maximum torque (Max Allowed Torque) is set to 150.0 g·cm, and minimum torque (Min Allowed Torque) is set to 0.2 g·cm.

(7) Strain Adjustment is set to 20.0% of Current Strain. An automatic tension adjustment mode (Auto Tension) is utilized in the measurement.

(8) Auto Tension Direction is set to Compression.

(9) Initial Static Force is set to 10.0 g, and Auto Tension Sensitivity is set to 40.0 g.

(10) The operating conditions of automatic tension (Auto Tension) involve a Sample Modulus of $1.0\times10^3$ Pa or more.

The measurement results of the storage elastic modulus G' obtained in the above measurement are plotted as temperature-storage elastic modulus, with temperature in the horizontal axis and the common logarithm Log G' of the storage elastic modulus G' in the vertical axis. The plotted points are smoothly connected to each other, to yield a temperature-storage elastic modulus curve. The slope of the obtained temperature-storage elastic modulus curve is worked out, and there is graphed a differential curve that results from differentiating the common logarithm Log G' with respect to temperature.

From the resulting differential curve there are obtained a minimal value P1 in the range of 50 to 70° C. and a minimal value P2 in the range of 80 to 120° C. Also obtained are the storage elastic modulus G' at the temperature of P1 and the storage elastic modulus G' at the temperature of P2. In a case where there is a plurality of minimal values in the above temperature ranges, the smallest value in the respective temperature range is selected as the minimal value P1 or P2.

In a case where it is difficult to smoothly connect the temperature-storage elastic modulus plots, the measured values may be subjected to smoothing processing, by combining three or five points, so that the points can be readily connected to each other smoothly. Joint smoothing of three points involves performing smoothing processing using a joint average value of three points, namely a certain measurement point, plus one preceding point and one succeeding point.

Cross-Sectional Observation of the Toner, Measurement of the Domain-Matrix Structure Firstly, a thin piece is produced as a reference sample of abundance.

The crystalline resin is thoroughly dispersed in a visible-light curable resin (product name: Aronix LCR series D-800), followed by curing through irradiation with-short-wavelength light. The obtained cured product is cut out with an ultramicrotome equipped with a diamond knife, to produce a 250 nm flaky sample. A flaky sample of the amorphous resin is prepared in the same manner.

The crystalline resin and the amorphous resin are mixed at 30/70 and 70/30, on a mass basis, and the mixtures are melt-kneaded, to yield kneaded products. These products are similarly dispersed in a visible light-curable resin, are cured, and are then cut out to thereby prepare flaky samples.

Cross sections of these cut reference samples are observed using a transmission electron microscope (electron microscope JEM-2800, by JEOL Ltd.) (TEM-EDX), and element mapping is performed by EDX. The elements to be mapped herein are carbon, oxygen and nitrogen.

Mapping conditions are as follows.

Acceleration voltage: 200 kV

Electron beam irradiation size: 1.5 nm

Live time limit: 600 sec

Dead time: 20-30

Mapping resolution: 256×256

Ratios of (oxygen intensity/carbon intensity) and (nitrogen intensity/carbon intensity) are calculated on the basis of the spectral intensity (average in a 10 nm square area) of each element, to prepare respective calibration curves relative to the mass ratios of the crystalline resin and amorphous resin. In the case where the monomer units of the crystalline resin contain nitrogen atoms, the calibration curve of (nitrogen intensity/carbon intensity) is resorted to in a further quantification.

Each toner sample is then analyzed.

After the toner has been sufficiently dispersed in a visible-light curable resin (Aronix LCR, series D-800), the resin is cured through irradiation with short-wavelength light. The resulting cured product is cut with an ultramicrotome equipped with a diamond knife, to produce a 250 nm flaky sample.

The cut sample is then observed using a transmission electron microscope (electron microscope JEM-2800 by JEOL Ltd.) (TEM-EDX). A toner particle cross-sectional image is obtained, and elemental mapping is performed by EDX. The elements to be mapped herein are carbon, oxygen and nitrogen.

Toner cross sections to be observed are selected as follows. Firstly, the cross-sectional area of a toner is worked out from an image of the cross section thereof, and the diameter of a circle (circle-equivalent diameter) having a surface area equal to the cross-sectional area is worked out. Herein there are only observed images of cross sections of a toner having an absolute value no greater than 1.0 μm of the difference between the circle-equivalent diameter and the weight-average particle diameter (D4) of the toner.

The toner particle cross section in the observation image is divided into 10 nm square areas. Herein (oxygen intensity/carbon intensity) and/or (nitrogen intensity/carbon intensity) is calculated on the basis of the (10 nm square average) spectral intensity of each element, in each area; the crystalline resin and the amorphous resin are then distinguished from each other as a result of a comparison against the above respective calibration curves. In a case where the content of the crystalline resin or amorphous resin is 80 mass % or higher the 10 nm square area is deemed to be taken up by the crystalline resin or amorphous resin.

When an area group taken up by the amorphous resin is present isolated, surrounded by the area group of crystalline resin, that area taken up by the amorphous resin is identified as a domain that includes the amorphous resin. When an area group of the crystalline resin is present as a continuous phase, that continuous phase is identified as the matrix that includes the crystalline resin. It is then ascertained whether the toner particle has such matrix and domains, to determine that the toner particle has a domain-matrix structure made up of a matrix including a crystalline resin and domains including an amorphous resin.

The surface areas of the matrix and domains thus identified can then be calculated, and a ratio of the domains relative to the combined surface area of the matrix plus the domains can be likewise be then calculated.

A binarization process is performed thereafter, to measure the particle diameter of domains present in a cross-sectional image of the toner. The particle diameter is herein the major axis of the domains. The domain particle diameter is measured at 10 points per toner cross section, for ten toner cross sections; the arithmetic mean value of the total 100 domain particle diameters is taken thereupon as the number-average diameter (μm) of the domains.

As samples of the crystalline resin and of the amorphous resin there can be used the crystalline resin and the amorphous resin, separated from the toner in accordance with the below-described methods.

Method for Separating Materials from the Toner

The materials contained in the toner can be separated therefrom by exploiting respective differences in solubility of the materials in a given solvent.

First separation: the toner is dissolved in methyl ethyl ketone (MEK) at 23° C., to separate a soluble fraction (amorphous resin) and an insoluble fraction (crystalline resin, wax, colorant, inorganic filler particles and so forth).

Second separation: the insoluble fraction obtained in the first separation (crystalline resin, wax, colorant, inorganic filler particles and so forth) is dissolved in MEK at 100° C., to separate a soluble fraction (crystalline resin and wax) and an insoluble fraction (colorant, inorganic filler particles and so forth).

Third separation: the soluble fraction (crystalline resin and wax) obtained in the second separation is dissolved in chloroform at 23° C., to separate a soluble fraction (crystalline resin) and an insoluble fraction (wax).

Measurement of the Contents of Crystalline Resin and Amorphous Resin in the Binder Resin, and of Inorganic Filler Particles, in the Toner In each separation step obtained in the above separations, the mass of the soluble and insoluble fractions is measured, to calculate the contents of the crystalline resin and of the amorphous resin in the binder resin of the toner.

The amount of inorganic filler particles in the toner is calculated on the basis of an X-ray fluorescence measurement. The X-ray fluorescence measurement of various elements conforms to JIS K 0119-1969. The measurement is specifically as follows.

The measuring device utilized herein is a wavelength-dispersive X-ray fluorescence analyzer (product name: "Axios" (by PANalytical B. V.), with ancillary dedicated software (product name: "SuperQ Ver. 4.0F" (by PANalytical B. V.) for setting measurement conditions and analyzing measurement data. Rhodium (Rh) is used as the anode of the X-ray tube, the measurement atmosphere is vacuum, the measurement diameter (collimator mask diameter) is set to 27 mm, and the measurement time is set to 10 seconds. Detection in the device is carried out using a proportional counter (PC) to measure light elements, and using a scintillation counter (SC) to measure heavy elements.

As the measurement sample, 4 g of toner are placed in a dedicated aluminum ring for pressing, and the toner is smoothed over. A pellet is used that is shaped to a thickness of 2 mm and a diameter of 39 mm through pressing for 60 seconds at 20 MPa using a tablet compression molder (product name: BRE-32, by Maekawa Testing Machine Mfg. Co., Ltd.). The measurement is carried out under the above conditions, and elements are identified on the basis of the obtained X-ray peak positions; element concentrations are calculated from a count rate (units: cps), which is the number of X-ray photons per unit time.

In a case for instance where the inorganic filler particles are calcium carbonate fine particles, these are mixed with the toner particle in amounts of 0.1 parts by mass, 1.0 parts by mass and 2.5 parts by mass of the calcium carbonate fine particles, relative to 100 parts by mass of the toner particle, to yield respective calibration curve samples. For each calibration curve sample there is produced a pellet of the sample, as described above, using the above tablet compression molder; when using PET as the analyzer crystal there is measured a count rate (unit: cps) of Si-Kα rays observed at a diffraction angle (2θ)=109.08°.

The acceleration voltage and current value of the X-ray generator are set herein to 24 kV and 100 mA, respectively. A linear-function calibration curve is then obtained, with the obtained X-ray count rate in the vertical axis and the amount of calcium carbonate fine particles in the calibration curve sample in the horizontal axis. The toner to be analyzed is then made into pellets as described above, using the tablet compression molder, and the count rate of the resulting Ca-Kα rays is measured. The content of calcium carbonate fine particles in the toner particle is calculated from the above calibration curve.

Methods for Identifying the Monomer Units Making up the Crystalline Resin and the Amorphous Resin, and for Measuring the Content Ratio of Monomer Units Identification of the monomer units that make up the crystalline resin and the amorphous resin and measurement of the content ratio of the monomer units are performed by $^1$H-NMR under the conditions below.

Measuring device: FT NMR device JNM-EX400 (by JEOL Ltd.)

Measurement frequency: 400 MHZ

Pulse condition: 5.0 μs

Frequency range: 10500 Hz

Number of scans: 64 scans

Measurement temperature: 30° ° C.

Sample: a sample is prepared by placing 50 mg of a measurement sample in a sample tube having an inner diameter of 5 mm, with addition of deuterated chloroform ($CDCl_3$) as a solvent, followed by dissolution in a thermostatic bath at 40° C.

From among the peaks attributed to the constituent elements of the first monomer unit, peaks independent from peaks attributed to constituent elements of other monomer units are selected on the basis of the obtained $^1$H-NMR chart, and an integration value $S_1$ of the selected peaks is calculated. From among the peaks attributed to constituent elements of monomer units derived from the second monomer unit there are similarly selected peaks independent from peaks attributed to constituent elements of other monomer units, and an integration value $S_2$ of the selected peaks is calculated.

In a case where the resin has a third monomer unit, then from among the peaks attributed to constituent elements of the third monomer unit there are selected peaks independent from peaks attributed to constituent elements of other monomer units, and an integration value $S_3$ of the selected peaks is calculated.

In a case where the resin further has a monomer unit X, such as the other monomer units, an integration value $S_x$ is calculated in the same manner.

The content ratio of the first monomer unit is determined as follows, using the above integration value $S_1$, $S_2$, $S_3$ and $S_x$. Further, $n_1$, $n_2$, $n_3$, $n_x$ are the number of hydrogen atoms in the constituent components to which there are attributed the peaks of interest for each segment.

$$\text{Content ratio of first monomer unit (mol \%)} = \{(S_1/n_1)/((S_1/n_1)+(S_2/n_2)+(S_3/n_3)\ \ldots +(S_x/n_x))\}\times 100$$

Similarly, the content ratios of the second monomer unit and the third monomer unit are worked out as follows.

$$\text{Content ratio of second monomer unit (mol \%)} = \{(S_2/n_2)/((S_1/n_1)+(S_2/n_2)+(S_3/n_3)\ \ldots +(S_x/n_x))\}\times 100$$

$$\text{Content ratio of third monomer unit (mol \%)} = \{(S_3/n_3)/((S_1/n_1)+(S_2/n_2)+(S_3/n_3)\ \ldots +(S_x/n_x))\}\times 100$$

In a case where in the crystalline resin and the amorphous resin there is used a polymerizable monomer that contains no hydrogen in constituent elements other than a vinyl group, the above content ratio is calculated in the same way as in $^1$H-NMR, but resorting herein to $^{13}$C-NMR using $^{13}$C as the measurement nucleus, in a single-pulse mode. Units of mol % can be converted to mass % on the basis of the molecular weight of the monomer units.

Method for Measuring the Melting Point, Endothermic Peak and Endothermic Quantity of Toner, Resins etc.

The melting points, endothermic peaks and endothermic quantities of the toner and the resins are measured using DSC Q1000 (by TA Instruments Inc.) under the following conditions.

Ramp rate: 10° C./min

Measurement start temperature: 20° C.

Measurement end temperature: 180° C.

The melting points of indium and zinc are used for temperature correction in the detection unit of the device, and the heat of fusion of indium is used for correcting the amount of heat. Specifically, 5 mg of a sample are weighed exactly, are placed in an aluminum pan, and a differential scanning calorimetric measurement is performed. An empty pan made of silver is used as a reference. The peak temperature of a maximum endothermic peak in a first temperature rise process is taken as the melting point. In a case where there is a plurality of peaks, the maximum endothermic peak is the peak at which the endothermic quantity is maximal. The endothermic quantity of the maximum endothermic peak is worked out. Attribution of peaks can be determined on the basis of DSC measurements of materials separated from the toner described above.

Then ΔH(T) and ΔH(W) can be calculated on the basis of measurements using the toner as a sample, and using the wax separated from the toner as a sample.

Method for Measuring the Softening Point (Tm) of Resins

The softening point of a given resin is measured herein using a capillary rheometer of constant-load extrusion type, "Flow characteristic evaluation device Flowtester CFT-500D" (by Shimadzu Corporation), according to the manual ancillary to the device. In this device, a measurement sample packed into a cylinder is melted by being heated up while under application of a constant load, from the top of the measurement sample, by means of a piston, and the melted measurement sample is then extruded from a die at the bottom of the cylinder, such that a flow curve can be obtained that denotes a relationship between the piston downstroke at this time and temperature.

The softening point is herein the "melting temperature according to a ½ method" set forth in the manual ancillary to the "Flow characteristic evaluation device Flowtester CFT-500D". The melting temperature in a ½ method is calculated as follows.

Firstly, ½ of the difference between the piston downstroke at the point in time of complete outflow (outflow completion point, herein Smax) and the piston downstroke at the point in time where outflow starts (lowest point, herein Smin) is worked out (this value is designated as X). Herein X=(Smax−Smin)/2). The temperature in the flow curve at a time where the piston downstroke reaches the sum of X and Smin yields herein the melting temperature by the ½ method.

The measurement sample that is used has a cylindrical shape, with a diameter of about 8 mm, and obtained by subjecting 1.0 g of resin to compressive forming for about 60 seconds at about 10 MPa in an environment at 25° C., using a tablet compression molder (NT-100H, by NPa System Co., Ltd.).

The concrete measurement operation conforms to the procedure in the manual ancillary to the device.

The measurement conditions of CFT-500D are as follows.

Test mode: heating method

Starting temperature: 50° C.

Saturated temperature: 200° ° C.

Measurement interval: 1.0° ° C.

Ramp rate: 4.0° C./min

Piston cross-sectional area: 1.000 cm$^2$

Test load (piston load): 10.0 kgf (0.9807 MPa)

Preheating time: 300 seconds

Die hole diameter: 1.0 mm

Die length: 1.0 mm

Method for Measuring Weight-average Particle Diameter (D4) of Toner (Toner Particle)

The weight-average particle diameter (D4) of the toner (toner particle) is calculated by carrying out measurements using a precision particle size distribution measuring device which employees a pore electrical resistance method and uses a 100 μm aperture tube ("Coulter Counter Multisizer 3" (registered trademark) available from Beckman Coulter) and accompanying dedicated software that is used to set measurement conditions and analyze measured data ("Beckman Coulter Multisizer 3 Version 3.51 produced by Beckman Coulter) (no. of effective measurement channels: 25,000), and then analyzing the measurement data.

A solution obtained by dissolving special grade sodium chloride in ion exchanged water at a concentration of approximately 1 mass %, such as "ISOTON II" (produced by Beckman Coulter), can be used as an aqueous electrolyte solution used in the measurements. Moreover, the dedicated software was set up as follows before carrying out measurements and analysis.

On the "Standard Operating Method (SOM) alteration screen" in the dedicated software, the total count number in control mode is set to 50000 particles, the number of measurements is set to 1, and the Kd value is set to "standard particle 10.0 μm" (Beckman Coulter). By pressing the threshold value/noise level measurement button, threshold values and noise levels are automatically set. In addition, the current is set to 1600 μA, the gain is set to 2, the electrolyte solution is set to ISOTON II, and the "Flush aperture tube after measurement" option is checked. On the "Screen for converting from pulse to particle diameter" in the dedicated software, the bin interval is set to logarithmic particle diameter, the particle diameter bin is set to 256 particle diameter bin, and the particle diameter range is set to from 2 μm to 60 μm. The specific measurement method is as follows.

(1) 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.
(2) 30 mL of the aqueous electrolyte solution is placed in a 100 mL glass flat bottomed beaker, and approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) 3-fold with ion exchanged water, is added to the beaker as a dispersing agent.
(3) A prescribed amount of ion exchanged water is placed in a water bath of an "Ultrasonic Dispersion System Tetora 150" (available from Nikkaki Bios Co., Ltd.) having an electrical output of 120 W, in which 2 oscillators having an oscillation frequency of 50 kHz are housed so that their phases are staggered by 180°, and approximately 2 mL of the Contaminon Nis added to the water bath.
(4) The beaker used in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.
(5) While the aqueous electrolyte solution in the beaker mentioned in section (4) above is being irradiated with ultrasonic waves, approximately 10 mg of toner particles are added a little at a time to the aqueous electrolyte solution and dispersed therein. The ultrasonic wave dispersion treatment is continued for a further 60 seconds. Moreover, when carrying out the ultrasonic wave dispersion, the temperature of the water bath is adjusted as appropriate to a temperature of from 10° C. to 40° C.
(6) The aqueous electrolyte solution mentioned in section (5) above, in which the toner (toner particle) is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50000.
(7) The weight average particle diameter (D4) is calculated by analyzing measurement data using the accompanying dedicated software. Moreover, when setting the graph/vol. % with the dedicated software, the "average diameter" on the analysis/volume-based statistical values (arithmetic mean) screen is weight average particle diameter (D4).

Measurement of Average Circularity

The average circularity of the toner is measured using a flow particle image analyzer "FPIA-3000" (by Sysmex Corporation) under measurement and analysis conditions at the time of calibration.

The concrete measurement method involved is as follows.

Firstly, about 20 mL of ion-exchanged water, having had solid impurities and so forth removed therefrom beforehand, are placed in a glass vessel. Then about 0.2 mL of a dilution containing a dispersing agent in the form of "Contaminon N" (10 mass % aqueous solution of a pH 7 neutral detergent for cleaning of precision instruments, containing a nonionic surfactant, an anionic surfactant and an organic builder, by Wako Pure Chemical Industries, Ltd.) diluted thrice by mass in ion-exchanged water, is added to the glass vessel.

Further, about 0.02 g of the measurement sample are added and are dispersed for 2 minutes using an ultrasonic disperser, to prepare a dispersion for measurement. The dispersion is cooled as appropriate down to a dispersion temperature from 10° ° C. to 40° C. The ultrasonic disperser that is used is a desktop ultrasonic cleaner/disperser "VS-150" (by Velvo-Clear Co.) having an oscillation frequency of 50 kHz and an electrical output of 150 W; herein, a predetermined amount of ion-exchanged water is placed in the water tank, and about 2 mL of the above Contaminon N are added into the water tank.

In the measurement there was used the above flow particle image analyzer fitted with a standard objective lens (10 magnifications), and Particle sheath "PSE-900A" (by Sysmex Corporation) was used as a sheath solution. A dispersion prepared according to the above procedure is introduced to the flow particle image analyzer, and 3000 toner particles are measured according to a total count mode, in an HPF measurement mode.

The average circularity of the toner is then worked out, with a binarization threshold at the time of particle analysis set to 85%, and with the analyzed particle diameter limited to a circle-equivalent diameter in the range from 1.985 μm to less than 39.69 μm.

In the measurement, automatic focus adjustment is performed before the start of the measurement, using standard latex particles (dilution of "RESEARCH AND TEST PARTICLES Latex Microsphere Suspensions 5200A", by Duke Scientific Corporation, in ion-exchanged water). Preferably, focus is adjusted thereafter every two hours for the same reasons as given the start of the measurement.

In the examples there is used a flow particle image analyzer calibrated by Sysmex Corporation and having been issued with a calibration certificate by Sysmex Corporation. The measurement is performed under the same measurement and analysis conditions as those at the time of issuance of the calibration certification, but herein the analyzed particle diameter is limited to a circle-equivalent diameter from 1.985 μm to less than 39.69 μm.

Method for Calculating SP Values

The SP values of the crystalline resin, the amorphous resin and the wax are worked out as follows, in accordance with the calculation method proposed by Fedors.

The evaporation energy (Δei) (cal/mol) and molar volume (Δvi) ($cm^3$/mol) of atoms or atomic groups in the molecular structure of each resin or wax are determined on the basis of tables given in "Polym. Eng. Sci., 14 (2), 147-154 (1974)"; herein $(4.184\times\Sigma\Delta ei/\Sigma\Delta vi)^{0.5}$ is taken as the SP value $(J/cm^3)^{0.5}$.

EXAMPLES

The basic configuration and features of the present disclosure have been described above; the present disclosure will be explained more specifically below on the basis of examples. However, the present disclosure is not limited to these examples in any way. Unless particularly noted otherwise, "parts" and "%" refer to a mass basis.

Production Example of Crystalline Resin 1

| | |
|---|---|
| Solvent: Toluene | 100.0 parts |
| Monomer composition | 100.0 parts |

(The monomer composition is a mixture of the following behenyl acrylate, styrene, acrylonitrile and 2-hydroxyethyl acrylate, in the proportions given below.)

| | |
|---|---|
| (Behenyl acrylate | 50.0 parts) |
| (Styrene | 30.0 parts) |
| (Acrylonitrile | 15.0 parts) |
| (2-hydroxyethyl acrylate | 5.0 parts) |
| Polymerization initiator | 0.5 parts |

-continued

[t-butyl peroxypivalate (by NOF Corporation: Perbutyl PV)]

The above materials were charged, under a nitrogen atmosphere, into a reaction vessel equipped with a reflux condenser, a stirrer, a thermometer and a nitrogen introduction tube. A polymerization reaction was conducted for 12 hours, through heating at 70° C. while the interior of the reaction vessel was stirred at 200 rpm, to yield a solution in which a polymer of the monomer composition was dissolved in toluene.

Subsequently, the temperature of the solution was lowered to 25° C. and then the solution was added to 1000.0 parts of methanol, while under stirring, to elicit precipitation of a methanol-insoluble fraction. The resulting methanol-insoluble fraction was filtered off, was further washed with methanol, and was thereafter vacuum-dried at 40° C. for 24 hours, to yield Crystalline resin 1. The melting point (Tp) of the obtained Crystalline resin 1 was 61° C.

Production Examples of Crystalline Resins 2 to 10

Crystalline resin 2 to 10 were obtained by conducting a reaction in the same way as in the production example of crystalline resin 1, but modifying herein the monomers and parts by mass as given in Table 1.

Production Example of Crystalline Resin 11

The above materials were weighed into a reactor that held dodecanediol (50 mol %) and sebacic acid (50 mol %), and that was equipped with a cooling tube, a stirrer, a nitrogen introduction tube and a thermocouple. The interior of the flask was then purged with nitrogen gas, after which the temperature was gradually raised, while under stirring, and the reaction was then conducted for 3 hours while under stirring at a temperature of 140° C.

Then tin 2-ethylhexanoate was added in an amount of 0.5% relative to the monomers, the above materials were added thereafter, the pressure in the reactor was lowered to 8.3 kPa, and the reaction was conducted for 4 hours while the temperature was maintained at 200° C., after which the pressure inside the reactor was gradually released, to revert to normal pressure, and yield Crystalline resin 11.

TABLE 1

| Crystalline | First monomer unit | | | Other monomer unit | | Second monomer unit | | Third monomer unit | | Physical properties |
|---|---|---|---|---|---|---|---|---|---|---|
| resin No. | Monomer | parts | Number of carbons in R1 in Formula (1) | Monomer | parts | Monomer | parts | Monomer | parts | SP value |
| 1 | BEA | 50.0 | 22 | St | 30.0 | ACN | 15.0 | HEA | 5.0 | 20.7 |
| 2 | STA | 50.0 | 18 | St | 30.0 | ACN | 15.0 | HEA | 5.0 | 20.8 |
| 3 | MYA | 50.0 | 30 | St | 30.0 | ACN | 15.0 | HEA | 5.0 | 20.6 |
| 4 | BEA | 50.0 | 22 | St | 30.0 | MCN | 15.0 | HEA | 5.0 | 20.3 |
| 5 | BEA | 50.0 | 22 | St | 30.0 | ACN | 15.0 | HEMA | 5.0 | 20.6 |
| 6 | BEA | 50.0 | 22 | St | 30.0 | ACN | 15.0 | HPMA | 5.0 | 20.6 |
| 7 | BEA | 60.0 | 22 | St | 30.0 | ACN | 5.0 | HEA | 5.0 | 19.7 |
| 8 | BEA | 60.0 | 22 | St | 33.0 | ACN | 5.0 | HEA | 2.0 | 19.5 |
| 9 | BEA | 32.0 | 22 | St | 53.0 | ACN | 10.0 | HEA | 5.0 | 20.6 |
| 10 | BEA | 28.0 | 22 | St | 57.0 | ACN | 10.0 | HEA | 5.0 | 20.7 |
| 11 | 1.12-dodecanediol | 50.0 | — | Sebacic acid | 50.0 | | | | | 19.7 |

The abbreviations in Table 1 are as follows. The parts of dodecanediol and sebacic acid given in Table 1 are mol parts.

BEA: Behenyl acrylate
STA: Stearyl acrylate
MYA: Myricyl acrylate
St: Styrene
ACN: Acrylonitrile
MCN: Methacrylonitrile
HEA: 2-hydroxyethyl acrylate
HEMA: 2-hydroxyethyl methacrylate
HPMA: 2-hydroxypropyl methacrylate

Production Example of Amorphous Resin 1

The following materials were charged, under a nitrogen atmosphere, into a reaction vessel equipped with a reflux condenser, a stirrer, a thermometer and a nitrogen introduction tube.

Polyoxyethylene (2.0)-2,2-bis(4-hydroxyphenyl) propane: 71.4 parts (50.0 mol parts)
Terephthalic acid: 14.7 parts (25.0 mol parts)
Adipic acid: 5.2 parts (10.0 mol parts)
Fumaric acid: 4.1 parts (15.0 mol parts)
Titanium tetrabutoxide: 2.0 parts The interior of the flask purged with nitrogen gas, after which the temperature was gradually raised, while under stirring; the reaction was then conducted for 2 hours while under stirring at a temperature of 200° C., and while the produced water was distilled off. The pressure within the reactor was lowered to 8.3 kPa and was maintained for 1 hour, followed by cooling down to 180° C., and reversal to atmospheric pressure (first reaction step).

Trimellitic anhydride: 8.2 parts (2.5 mol parts)

Tert-butyl catechol (polymerization inhibitor): 0.1 parts

Thereafter, the above materials were added, the pressure in the reactor was lowered to 8.3 kPa, the temperature was maintained at 150° C., and in that state, the reaction was conducted for 4 hours, and was thereupon stopped through lowering of the temperature (second reaction step), to yield Amorphous resin 1.

Production Examples of Amorphous Resins 2 and 3

Amorphous resins 2 and 3 were obtained by conducting a reaction in the same way as in the production example of Amorphous resin 1, but modifying herein the monomers and parts by mass as given in Table 2.

Production Example of Amorphous Resin 4

Herein 50.0 parts of xylene were charged into an autoclave that was then purged with nitrogen, followed by heating up to 185° C., in a sealed state, while under stirring.

Into the autoclave there was continuously added dropwise, over 3 hours, a mixed solution of 28.0 parts of styrene, 7.0 parts of n-butyl acrylate, 18.0 parts of acrylonitrile, 1.5 parts of di-tert-butyl peroxide and 20.0 parts of xylene, while under control of the temperature inside the autoclave to 185° C., to elicit polymerization. The autoclave was further kept at the same temperature for 1 hour, to complete the polymerization, and the solvent was removed, to yield Amorphous resin 4.

Production Example of Toner Particle 1

| | |
|---|---|
| Crystalline resin 1: | 60 parts |
| Amorphous resin 1: | 40 parts |
| Wax: | 10 parts |
| (Fischer-Tropsch A; melting point 92° C.) | |
| Colorant 1: | 5 parts |
| (Cyan pigment by Dainichiseika Color & Chemicals Mfg. Co., Ltd.): | Pigment Blue 15:3) |
| Inorganic filler: | 10 parts |

(Calcium Carbonate Having a Number-Average Particle Diameter of 0.3 μm and Treated with a Fatty Acid (Stearic Acid))

The above materials were mixed using a Henschel mixer (model FM-75, by Nippon Coke & Engineering Co., Ltd.) at a rotational speed of 20 $s^{-1}$ and for a rotation time of 5 min, followed by kneading in a twin-screw kneader (PCM-30, by Ikegai Corp.) set to a temperature of 120° C., at a screw rotational speed of 250 rpm and at a discharge temperature of 130° C.

The obtained kneaded product was rolled and cooled using a drum flaker (MBD30-30, by Nippon Coke & Engineering Co., Ltd.). The temperature of the cooling water was set at 50° C., and conditions were set so that the thickness of the resin composition after rolling was 1.0 mm. Thereafter, the rolled resin composition was held at 50° ° C. for 45 minutes, for the purpose of annealing. The obtained resin composition was cooled down to room temperature and was coarsely pulverized to 1 mm or less, using a hammer mill, to yield a coarsely pulverized product. The obtained coarsely pulverized product was then finely pulverized using a mechanical pulverizer (T-250, by Freund-Turbo Corporation).

TABLE 2

| Amorphous resin | Polymerizable monomer 1 | | Polymerizable monomer 2 | | Polymerizable monomer 3 | | Polymerizable monomer 4 | | Physical properties |
|---|---|---|---|---|---|---|---|---|---|
| No. | Type | Mol parts | Type | Mol parts | Type | Mol parts | Type | Mol parts | SP value |
| 1 | BPA-EO | 50.0 | TPA | 25.0 | FA | 10.0 | AA | 15.0 | 24.5 |
| 2 | BPA-PO | 60.0 | TPA | 25.0 | SA | 5.0 | AA | 10.0 | 23.3 |
| 3 | BPA-PO | 60.0 | TPA | 15.0 | SA | 5.0 | AA | 20.0 | 23.1 |
| 4 | St | 28.0 | BA | 7.0 | AN | 18.0 | — | — | 21.8 |

The abbreviations in Table 2 are as follows. In Table 2 the numerical values for St, BA and AN are not mol parts, but parts by mass. The units of SP value are $(J/cm^3)^{0.5}$.

BPA-EO: Polyoxyethylene (2.0)-2,2-bis(4-hydroxyphenyl)propane

BPA-PO: Polyoxypropylene (2.0)-2,2-bis(4-hydroxyphenyl)propane

TPA: Terephthalic acid

FA: Fumaric acid

SA: Succinic acid

AA: Adipic acid

PE: Polyethylene

AN: Acrylonitrile

BA: Butyl acrylate

St: Styrene

The product was classified using Faculty F-300 (by Hosokawa Micron Corporation), to yield toner particle 1 having a weight-average particle diameter (D4) of 6.0 μm, an average circularity of 0.965, and a domain number-average diameter of 0.20 μm. The operating conditions were set to a rotational speed of 130 $s^{-1}$ of a classification rotor, and a rotational speed of 120 $s^{-1}$ of a distribution rotor.

Production Examples of Toner Particles 2 to 35

Toner particles 2 to 35 were produced in the same way as in the production example of Toner particle 1, but modifying herein the type and number of added parts of the crystalline resin, the type and number of added parts of the amorphous resin, the kneading conditions and the annealing conditions, as given in Tables 3 and 4.

TABLE 3

| Toner particle No. | Crystalline resin No. | Crystalline resin Parts | Amorphous resin No. | Amorphous resin Parts | Amorphous resin Domain size µm | WAX Type | WAX Melting point | WAX Parts | WAX SP value | Filler Type | Filler Particle diameter µm | Filler Surface treatment | Filler Parts |
|---|---|---|---|---|---|---|---|---|---|---|---|---|---|
| 1 | 1 | 60.0 | 1 | 40.0 | 0.20 | FTA | 92° C. | 10 | 17.1 | CC | 0.3 | FA | 10 |
| 2 | 2 | 60.0 | 1 | 40.0 | 0.15 | FTA | 92° C. | 10 | 17.1 | CC | 0.3 | FA | 10 |
| 3 | 3 | 60.0 | 1 | 40.0 | 0.25 | FTA | 92° C. | 10 | 17.1 | CC | 0.3 | FA | 10 |
| 4 | 4 | 60.0 | 1 | 40.0 | 0.35 | FTA | 92° C. | 10 | 17.1 | CC | 0.3 | FA | 10 |
| 5 | 5 | 60.0 | 1 | 40.0 | 0.28 | FTA | 92° C. | 10 | 17.1 | CC | 0.3 | FA | 10 |
| 6 | 6 | 60.0 | 1 | 40.0 | 0.30 | FTA | 92° C. | 10 | 17.1 | CC | 0.3 | FA | 10 |
| 7 | 1 | 60.0 | 1 | 40.0 | 0.50 | FTA | 92° C. | 10 | 17.1 | CC | 0.3 | None | 10 |
| 8 | 1 | 60.0 | 1 | 40.0 | 1.00 | FTA | 92° C. | 10 | 17.1 | CC | 0.3 | FA | 10 |
| 9 | 1 | 60.0 | 1 | 40.0 | 0.15 | FTA | 92° C. | 10 | 17.1 | CC | 0.3 | FA | 10 |
| 10 | 1 | 60.0 | 1 | 40.0 | 0.50 | FTA | 92° C. | 10 | 17.1 | K | 0.2 | None | 10 |
| 11 | 1 | 60.0 | 1 | 40.0 | 1.40 | FTA | 92° C. | 10 | 17.1 | CC | 0.3 | FA | 5 |
| 12 | 1 | 60.0 | 1 | 40.0 | 1.70 | FTA | 92° C. | 10 | 17.1 | CC | 0.3 | FA | 3 |
| 13 | 1 | 60.0 | 1 | 40.0 | 0.11 | FTA | 92° C. | 10 | 17.1 | CC | 0.3 | FA | 20 |
| 14 | 1 | 60.0 | 1 | 40.0 | 0.09 | FTA | 92° C. | 10 | 17.1 | CC | 0.3 | FA | 23 |
| 15 | 7 | 60.0 | 1 | 40.0 | 1.50 | FTA | 92° C. | 10 | 17.1 | CC | 0.3 | FA | 10 |
| 16 | 8 | 60.0 | 1 | 40.0 | 2.00 | FTA | 92° C. | 10 | 17.1 | CC | 0.3 | FA | 10 |
| 17 | 1 | 60.0 | 2 | 40.0 | 0.12 | FTA | 92° C. | 10 | 17.1 | CC | 0.3 | FA | 10 |
| 18 | 1 | 60.0 | 3 | 40.0 | 0.10 | FTA | 92° C. | 10 | 17.1 | CC | 0.3 | FA | 10 |
| 19 | 1 | 60.0 | 1 | 40.0 | 0.20 | FTB | 77° C. | 10 | 16.6 | CC | 0.3 | FA | 10 |
| 20 | 1 | 37.0 | 1 | 63.0 | 2.40 | FTA | 92° C. | 10 | 17.1 | CC | 0.3 | FA | 10 |
| 21 | 1 | 68.0 | 1 | 32.0 | 0.13 | FTA | 92° C. | 10 | 17.1 | CC | 0.3 | FA | 10 |
| 22 | 1 | 60.0 | 3 | 40.0 | 0.06 | FTA | 92° C. | 10 | 17.1 | CC | 0.3 | FA | 10 |
| 23 | 1 | 60.0 | 3 | 40.0 | 0.04 | FTA | 92° C. | 10 | 17.1 | CC | 0.3 | FA | 10 |
| 24 | 8 | 60.0 | 1 | 40.0 | 2.95 | FTA | 92° C. | 10 | 17.1 | None | — | — | — |
| 25 | 8 | 60.0 | 1 | 40.0 | 3.05 | FTA | 92° C. | 10 | 17.1 | None | — | — | — |
| 26 | 9 | 60.0 | 1 | 40.0 | 0.26 | FTA | 92° C. | 10 | 17.1 | CC | 0.3 | FA | 10 |
| 27 | 10 | 60.0 | 1 | 40.0 | 0.21 | FTA | 92° C. | 10 | 17.1 | CC | 0.3 | FA | 10 |
| 28 | 1 | 60.0 | 4 | 40.0 | 0.09 | FTA | 92° C. | 10 | 17.1 | CC | 0.3 | FA | 10 |
| 29 | 1 | 33.0 | 1 | 67.0 | 0.20 | FTA | 92° C. | 10 | 17.1 | CC | 0.3 | FA | 10 |
| 30 | 11 | 72.0 | 1 | 28.0 | 0.20 | FTA | 92° C. | 10 | 17.1 | CC | 0.3 | FA | 10 |
| 31 | 1 | 100.0 | — | 0.0 | — | FTA | 92° C. | 10 | 17.1 | CC | 0.3 | FA | 10 |
| 32 | 1 | 60.0 | 1 | 40.0 | 0.20 | BB | 75° C. | 10 | 17.6 | CC | 0.3 | FA | 10 |
| 33 | 1 | 60.0 | 1 | 40.0 | 0.20 | FTA | 92° C. | 10 | 17.1 | CC | 0.3 | FA | 10 |
| 34 | 1 | 40.0 | 1 | 60.0 | 0.20 | FTA | 92° C. | 10 | 17.1 | CC | 0.3 | FA | 20 |
| 35 | 1 | 90.0 | 1 | 10.0 | 0.20 | FTA | 92° C. | 20 | 17.1 | CC | 0.3 | FA | 10 |

In the Table 3, "Domain size" indicates "domain number-average diameter". "FTA" indicates Fischer-Tropsch A, "FTB" indicates Fischer-Tropsch B, and "BB" indicates Behenyl behenate. "CC" indicates Calcium carbonate, and "K" indicates Kaolin. "FA" indicates Fatty acid treatment.

TABLE 4

| Toner particle No. | Kneading conditions: Screw rotational speed | Kneading conditions: Kneading temperature | Annealing: Annealing process | Annealing: Annealing time |
|---|---|---|---|---|
| 1 | 250 rpm | 120° C. | After kneading | 45 min |
| 2 | 250 rpm | 120° C. | After kneading | 45 min |
| 3 | 250 rpm | 120° C. | After kneading | 45 min |
| 4 | 250 rpm | 120° C. | After kneading | 45 min |
| 5 | 250 rpm | 120° C. | After kneading | 45 min |
| 6 | 250 rpm | 120° C. | After kneading | 45 min |
| 7 | 250 rpm | 120° C. | After kneading | 45 min |
| 8 | 250 rpm | 120° C. | After kneading | 20 min |
| 9 | 250 rpm | 120° C. | After toner formation | 45 min |
| 10 | 250 rpm | 120° C. | After kneading | 45 min |
| 11 | 250 rpm | 120° C. | After kneading | 45 min |
| 12 | 250 rpm | 120° C. | After kneading | 45 min |
| 13 | 250 rpm | 120° C. | After kneading | 45 min |
| 14 | 250 rpm | 120° C. | After kneading | 45 min |
| 15 | 250 rpm | 120° C. | After kneading | 45 min |
| 16 | 250 rpm | 120° C. | After kneading | 45 min |
| 17 | 250 rpm | 120° C. | After kneading | 45 min |

TABLE 4-continued

| Toner particle No. | Kneading conditions: Screw rotational speed | Kneading conditions: Kneading temperature | Annealing: Annealing process | Annealing: Annealing time |
|---|---|---|---|---|
| 18 | 250 rpm | 120° C. | After kneading | 45 min |
| 19 | 250 rpm | 120° C. | After kneading | 45 min |
| 20 | 250 rpm | 120° C. | After kneading | 45 min |
| 21 | 250 rpm | 120° C. | After kneading | 45 min |
| 22 | 300 rpm | 100° C. | After kneading | 45 min |
| 23 | 400 rpm | 100° C. | After kneading | 45 min |
| 24 | 200 rpm | 140° C. | After kneading | 45 min |
| 25 | 150 rpm | 140° C. | After kneading | 45 min |
| 26 | 250 rpm | 120° C. | After kneading | 45 min |
| 27 | 250 rpm | 120° C. | After kneading | 45 min |
| 28 | 250 rpm | 120° C. | After kneading | 45 min |
| 29 | 250 rpm | 120° C. | After kneading | 45 min |
| 30 | 250 rpm | 120° C. | After kneading | 45 min |
| 31 | 250 rpm | 120° C. | After kneading | 45 min |
| 32 | 250 rpm | 120° C. | After kneading | 45 min |
| 33 | 250 rpm | 120° C. | None | — |
| 34 | 250 rpm | 120° C. | After kneading | 45 min |
| 35 | 250 rpm | 120° C. | After kneading | 45 min |

Regarding annealing, "After toner formation" signifies that annealing was performed once a toner particle was obtained.

TABLE 5

| Toner | Crystalline resin | | Amorphous resin | | WAX | | SP value difference | | Domain | | |
|---|---|---|---|---|---|---|---|---|---|---|---|
| particle No. | No. | SP1 value | No. | SP2 value | Type | SP3 value | \| SP2 − SP1 \| | \| SP3 − SP1 \| | Resin | Size (μm) | Matrix Resin |
| 1 | 1 | 20.7 | 1 | 24.5 | FTA | 17.1 | 3.7 | 3.6 | Amorphous | 0.20 | Crystalline |
| 2 | 2 | 20.8 | 1 | 24.5 | FTA | 17.1 | 3.6 | 3.7 | Amorphous | 0.15 | Crystalline |
| 3 | 3 | 20.6 | 1 | 24.5 | FTA | 17.1 | 3.8 | 3.5 | Amorphous | 0.25 | Crystalline |
| 4 | 4 | 20.3 | 1 | 24.5 | FTA | 17.1 | 4.2 | 3.2 | Amorphous | 0.35 | Crystalline |
| 5 | 5 | 20.6 | 1 | 24.5 | FTA | 17.1 | 3.9 | 3.5 | Amorphous | 0.28 | Crystalline |
| 6 | 6 | 20.6 | 1 | 24.5 | FTA | 17.1 | 3.8 | 3.5 | Amorphous | 0.30 | Crystalline |
| 7 | 1 | 20.7 | 1 | 24.5 | FTA | 17.1 | 3.7 | 3.6 | Amorphous | 0.50 | Crystalline |
| 8 | 1 | 20.7 | 1 | 24.5 | FTA | 17.1 | 3.7 | 3.6 | Amorphous | 1.00 | Crystalline |
| 9 | 1 | 20.7 | 1 | 24.5 | FTA | 17.1 | 3.7 | 3.6 | Amorphous | 0.15 | Crystalline |
| 10 | 1 | 20.7 | 1 | 24.5 | FTA | 17.1 | 3.7 | 3.6 | Amorphous | 0.50 | Crystalline |
| 11 | 1 | 20.7 | 1 | 24.5 | FTA | 17.1 | 3.7 | 3.6 | Amorphous | 1.40 | Crystalline |
| 12 | 1 | 20.7 | 1 | 24.5 | FTA | 17.1 | 3.7 | 3.6 | Amorphous | 1.70 | Crystalline |
| 13 | 1 | 20.7 | 1 | 24.5 | FTA | 17.1 | 3.7 | 3.6 | Amorphous | 0.11 | Crystalline |
| 14 | 1 | 20.7 | 1 | 24.5 | FTA | 17.1 | 3.7 | 3.6 | Amorphous | 0.09 | Crystalline |
| 15 | 7 | 19.7 | 1 | 24.5 | FTA | 17.1 | 4.8 | 2.6 | Amorphous | 1.50 | Crystalline |
| 16 | 8 | 19.5 | 1 | 24.5 | FTA | 17.1 | 4.9 | 2.4 | Amorphous | 2.00 | Crystalline |
| 17 | 1 | 20.7 | 2 | 23.3 | FTA | 17.1 | 2.5 | 3.6 | Amorphous | 0.12 | Crystalline |
| 18 | 1 | 20.7 | 3 | 23.1 | FTA | 17.1 | 2.4 | 3.6 | Amorphous | 0.10 | Crystalline |
| 19 | 1 | 20.7 | 1 | 24.5 | FTB | 16.6 | 3.7 | 4.1 | Amorphous | 0.20 | Crystalline |
| 20 | 1 | 20.7 | 1 | 24.5 | FTA | 17.1 | 3.7 | 3.6 | Amorphous | 2.40 | Crystalline |
| 21 | 1 | 20.7 | 1 | 24.5 | FTA | 17.1 | 3.7 | 3.6 | Amorphous | 0.13 | Crystalline |
| 22 | 1 | 20.7 | 3 | 23.1 | FTA | 17.1 | 2.4 | 3.6 | Amorphous | 0.06 | Crystalline |
| 23 | 1 | 20.7 | 3 | 23.1 | FTA | 17.1 | 2.4 | 3.6 | Amorphous | 0.04 | Crystalline |
| 24 | 8 | 19.5 | 1 | 24.5 | FTA | 17.1 | 4.9 | 2.4 | Amorphous | 2.95 | Crystalline |
| 25 | 8 | 19.5 | 1 | 24.5 | FTA | 17.1 | 4.9 | 2.4 | Amorphous | 3.05 | Crystalline |
| 26 | 9 | 20.6 | 1 | 24.5 | FTA | 17.1 | 3.8 | 3.5 | Amorphous | 0.26 | Crystalline |
| 27 | 10 | 20.7 | 1 | 24.5 | FTA | 17.1 | 3.7 | 3.6 | Amorphous | 0.21 | Crystalline |
| 28 | 1 | 20.7 | 4 | 21.8 | FTA | 17.1 | 1.1 | 3.6 | Amorphous | 0.09 | Crystalline |
| 29 | 1 | 20.7 | 1 | 24.5 | FTA | 17.1 | 3.7 | 3.6 | Crystalline | 0.20 | Amorphous |
| 30 | 11 | 19.7 | 1 | 24.5 | FTA | 17.1 | 4.8 | 2.6 | Amorphous | 0.20 | Crystalline |
| 31 | 1 | 20.7 | — | — | FTA | 17.1 | — | 3.6 | — | — | Crystalline |
| 32 | 1 | 20.7 | 1 | 24.5 | BB | 17.6 | 3.7 | 3.1 | Amorphous | 0.20 | Crystalline |
| 33 | 1 | 20.7 | 1 | 24.5 | FTA | 17.1 | 3.7 | 3.6 | Amorphous | 0.20 | Crystalline |
| 34 | 1 | 20.7 | 1 | 24.5 | FTA | 17.1 | 3.7 | 3.6 | Amorphous | 2.80 | Crystalline |
| 35 | 1 | 20.7 | 1 | 24.5 | FTA | 17.1 | 3.7 | 3.6 | Amorphous | 0.15 | Crystalline |

In the table, "FTA" indicates Fischer-Tropsch A, "FTB" indicates Fischer-Tropsch B, and "BB" indicates Behenyl behenate. "Size (μm)" for "Domain" is the number-average diameter of the domains.

Production Example of Toner 1

| | |
|---|---|
| Toner particle 1: | 100 parts |
| External additive particles 1 for toner: | 5.0 parts |

The above materials were mixed in a Henschel Mixer Model FM-10C (by Mitsui Miike Engineering Corporation) at a rotational speed of 30 $s^{-1}$ for a rotation time of 10 minutes, to yield Toner 1. The viscoelasticity and rate of change in wax crystallinity in the obtained toner were measured in accordance with the above measuring methods; the results are given in Table 6.

The results of the measurement of the cross sections of the obtained toner in accordance with the above methods revealed that the matrix included a crystalline resin and the domains included an amorphous resin.

Production Examples of Toners 2 to 35

Toners 2 to 35 were produced in the same way as in the production example of Toner 1 but modifying herein the toner particle to Toner particles 2 to 35.

In the obtained Toners 1 to 35, the content ratio of the first monomer unit in the crystalline resin and the content ratio of the inorganic filler particles were measured in accordance with the above methods; the results were found to match the number of parts added during production of the toner.

Production Example of Magnetic Carrier 1

Magnetite 1 (intensity of magnetization 65 $Am^2/kg$ in a $1000/4\pi$(kA/m) magnetic field) having a number-average particle diameter of 0.30 μm Magnetite 2 (intensity of magnetization 65 $Am^2/kg$ in a $1000/4\pi$(kA/m) magnetic field) having a number-average particle diameter of 0.50 μm Herein 4.0 parts of a silane compound (3-(2-aminoethylaminopropyl)trimethoxysilane) were added relative to 100 parts of each of the above materials, with high-speed mixing and stirring at 100° C. or above inside the vessel, to treat the respective fine particles.

| | |
|---|---|
| Phenol: | 10 mass % |
| Formaldehyde solution: | 6 mass % (formaldehyde 40 mass %, methanol 10 mass %, water 50 mass %) |
| Magnetite 1 treated with the above silane compound: | 58 mass % |
| Magnetite 2 treated with the above silane compound: | 26 mass % |

Then 100 parts of the above materials, 5 parts of a 28 mass % aqueous ammonia solution, and 20 parts of water were charged into a flask, the temperature was raised to 85° C.

over 30 minutes while under mixing by stirring, and a polymerization reaction was conducted by holding that temperature for 3 hours, to cure the generated phenolic resin. The cured phenolic resin was then cooled down to 30° C., followed by further addition of water, after which the supernatant was removed, and the precipitate was washed with water and was subsequently air-dried. Next, the resulting product was dried under reduced pressure (5 mmHg or lower) at a temperature of 60° C., to yield a spherical Magnetic carrier 1 of magnetic body-dispersed type. The volume-basis 50% particle diameter (D50) of Magnetic carrier 1 was 34.2 μm.

Production Example of Two-Component Developer 1

Herein 8.0 parts of Toner 1 were added to 92.0 parts of Magnetic carrier 1, and the whole was mixed using a V-type mixer (V-20, by Seishin Enterprise Co., Ltd.), to yield Two-component developer 1.

Production Examples of Two-Component Developers 2 to 35

Two-component developers 2 to 35 were obtained by using Toners 2 to 35, respectively, in the production example of Two-component developer 1.

In the table, “Temp.” indicates “Temperature at minimal value”. G' is the storage elastic modulus G' at the temperature at each minimal value. For instance a notation 10ˆ6 signifies herein $10^6$.

The “WAX crystallinity change rate” is the value of “ΔH(T)/ΔH(W)”.

The “Domain area %” is the ratio of domains relative to the combined surface areas of the matrix and the domains.

Example 1

Low-Temperature Fixability

An evaluation was performed using the above Two-component developer 1.

Two-component developer 1 was introduced into a cyan developing device, using an image forming apparatus in the form of a modified printer imageRUNNER ADVANCE C5560 for digital commercial printing, by Canon Inc. The apparatus was modified so as to allow freely setting the fixation temperature, process speed, the DC voltage VDC of a developer carrier, the charging voltage VD of an electrostatic latent image bearing member, and laser power. To evaluate image output, an FFh image (solid image) having a desired image ratio was outputted, and VDC, VD and laser power were adjusted so that the toner laid-on level of the

TABLE 6

| | Toner | P1 | | | P2 | | | WAX | |
|---|---|---|---|---|---|---|---|---|---|
| Toner No. | particle No. | Temp. ° C. | Minimal value | G' (Pa) | Temp. ° C. | Minimal value | G' (Pa) | crystallinity change rate | Domain area % |
| 1 | 1 | 60.4 | −0.30 | 4.1 × 10ˆ6 | 94.4 | −0.10 | 2.6 × 10ˆ3 | 0.81 | 40 |
| 2 | 2 | 53.3 | −0.25 | 5.3 × 10ˆ6 | 93.4 | −0.12 | 1.8 × 10ˆ3 | 0.83 | 40 |
| 3 | 3 | 68.1 | −0.25 | 5.3 × 10ˆ6 | 91.4 | −0.13 | 1.5 × 10ˆ3 | 0.78 | 40 |
| 4 | 4 | 61.4 | −0.32 | 4.2 × 10ˆ6 | 91.2 | −0.13 | 5.5 × 10ˆ3 | 0.85 | 40 |
| 5 | 5 | 61.4 | −0.30 | 4.7 × 10ˆ6 | 91.2 | −0.09 | 6.8 × 10ˆ3 | 0.78 | 40 |
| 6 | 6 | 59.8 | −0.26 | 61 × 10ˆ5 | 91.1 | −0.11 | 6.1 × 10ˆ3 | 0.79 | 40 |
| 7 | 7 | 60.4 | −0.30 | 8.1 × 10ˆ5 | 94.4 | −0.03 | 5.6 × 10ˆ3 | 0.81 | 40 |
| 8 | 8 | 60.4 | −0.30 | 5.5 × 10ˆ5 | 94.4 | −0.15 | 8.4 × 10ˆ3 | 0.71 | 40 |
| 9 | 9 | 59.4 | −0.28 | 8.8 × 10ˆ5 | 94.4 | −0.12 | 9.5 × 10ˆ3 | 0.73 | 40 |
| 10 | 10 | 60.1 | −0.25 | 3.1 × 10ˆ6 | 94.4 | −0.12 | 8.8 × 10ˆ3 | 0.81 | 40 |
| 11 | 11 | 60.4 | −0.30 | 4.1 × 10ˆ6 | 94.4 | −0.12 | 1.3 × 10ˆ3 | 0.75 | 40 |
| 12 | 12 | 59.2 | −0.32 | 1.1 × 10ˆ6 | 94.4 | −0.12 | 8.3 × 10ˆ2 | 0.73 | 40 |
| 13 | 13 | 60.8 | −0.43 | 9.2 × 10ˆ6 | 94.4 | −0.12 | 4.5 × 10ˆ2 | 0.88 | 40 |
| 14 | 14 | 60.9 | −0.46 | 1.2 × 10ˆ7 | 95.1 | −0.15 | 9.8 × 10ˆ3 | 0.88 | 40 |
| 15 | 15 | 59.1 | −0.25 | 7.1 × 10ˆ5 | 94.2 | −0.10 | 2.3 × 10ˆ3 | 0.73 | 40 |
| 16 | 16 | 59.1 | −0.23 | 6.7 × 10ˆ5 | 94.3 | −0.11 | 2.4 × 10ˆ3 | 0.68 | 40 |
| 17 | 17 | 60.2 | −0.28 | 6.2 × 10ˆ5 | 94.2 | −0.11 | 2.1 × 10ˆ3 | 0.81 | 40 |
| 18 | 18 | 58.2 | −0.25 | 5.7 × 10ˆ5 | 94.2 | −0.14 | 2.5 × 10ˆ3 | 0.82 | 40 |
| 19 | 19 | 60.2 | −0.24 | 5.1 × 10ˆ5 | 80.2 | −0.05 | 3.3 × 10ˆ2 | 0.71 | 40 |
| 20 | 20 | 60.4 | −0.32 | 9.2 × 10ˆ6 | 94.2 | −0.10 | 8.3 × 10ˆ3 | 0.84 | 63 |
| 21 | 21 | 60.1 | −0.32 | 2.2 × 10ˆ6 | 94.5 | −0.12 | 8.3 × 10ˆ3 | 0.68 | 32 |
| 22 | 22 | 60.5 | −0.32 | 4.7 × 10ˆ6 | 94.3 | −0.12 | 2.6 × 10ˆ3 | 0.81 | 40 |
| 23 | 23 | 60.4 | −0.31 | 4.5 × 10ˆ6 | 94.3 | −0.11 | 2.4 × 10ˆ3 | 0.81 | 40 |
| 24 | 24 | 60.4 | −0.31 | 2.3 × 10ˆ6 | 94.1 | −0.11 | 2.2 × 10ˆ3 | 0.88 | 40 |
| 25 | 25 | 60.4 | −0.31 | 1.5 × 10ˆ6 | 94.1 | −0.12 | 2.3 × 10ˆ3 | 0.88 | 40 |
| 26 | 26 | 60.4 | −0.21 | 1.3 × 10ˆ7 | 94.1 | −0.08 | 5.5 × 10ˆ3 | 0.88 | 40 |
| 27 | 27 | 60.2 | −0.21 | 1.5 × 10ˆ7 | 94.1 | −0.08 | 6.9 × 10ˆ3 | 0.92 | 40 |
| 28 | 28 | 60.4 | −0.22 | 5.5 × 10ˆ5 | 94.0 | −0.05 | 3.5 × 10ˆ2 | 0.71 | 40 |
| 29 | 29 | 60.4 | −0.13 | 5.1 × 10ˆ7 | 94.4 | −0.01 | 2.6 × 10ˆ4 | 0.85 | 67 |
| 30 | 30 | 60.5 | −0.55 | 4.1 × 10ˆ6 | No differential peak | — | — | 0.97 | 28 |
| 31 | 31 | 60.4 | −0.48 | 1.5 × 10ˆ4 | No differential peak | — | — | 0.65 | None |
| 32 | 32 | 60.1 | −0.51 | 3.5 × 10ˆ4 | No differential peak | — | — | 0.65 | 40 |
| 33 | 33 | 60.4 | −0.15 | 3.1 × 10ˆ4 | 94.0 | −0.15 | 2.4 × 10ˆ3 | 0.62 | 40 |
| 34 | 34 | 60.2 | −0.22 | 1.1 × 10ˆ7 | 94.4 | −0.01 | 4.4 × 10ˆ4 | 0.75 | 60 |
| 35 | 35 | 60.4 | −0.21 | 5.1 × 10ˆ5 | 95.0 | −0.40 | 1.5 × 10ˆ1 | 0.84 | 10 |

FFh image, on paper, took on a desired value; low-temperature fixability was then evaluated.

Herein "FFh" denotes a value obtained by displaying 256 gradations in hexadecimal notation, with 00h as the first of the 256 gradations (white background portion) and FFh as the 256-th of the 256 gradations (solid portion).

The evaluation was performed on the basis of the evaluation method below; the results are given in Table 5.

Paper: GFC-081(81.0 $g/m^2$)
(sold by Canon Marketing Japan Inc.)
Laid-on level of toner on paper: 0.70 $mg/cm^2$
(adjusted on the basis of the DC voltage VDC of the developer carrier, the charging voltage VD of the electrostatic latent image bearing member, and laser power)
Evaluation image: 2 cm×5 cm image in the center of the above A4 paper
Test environment: low-temperature, low-humidity environment: temperature 15° C./humidity 10% RH (hereafter "L/L")
Fixation temperature: 140° C.
Process speed: 400 mm/sec The above evaluation image was outputted, and low-temperature fixability was evaluated. The value of the rate of decrease of image density was taken as an evaluation index of low-temperature fixability. To evaluate the rate of decrease in image density, image density at a central portion was measured firstly using an X-Rite color reflection densitometer (500 series: by X-Rite Inc.). Next, a load of 4.9 kPa (50 $g/cm^2$) was applied to the portion where the image density was measured, and the fixed image was rubbed (5 back-and-forth rubs) with lens-cleaning paper, whereupon image density was measured again. The rate of decrease of image density before and after rubbing was calculated on the basis of the expression below. The obtained rate of decrease of the image density was evaluated in accordance with the evaluation criteria below.

$$\text{Rate of decrease of image density} = \text{(image density before rubbing} - \text{image density after rubbing)} / \text{(image density before rubbing)} \times 100$$

Evaluation Criteria

AA: Rate of decrease of image density lower than 1.0%
A: Rate of decrease of image density from 1.0% to less than 3.0%
B: Rate of decrease of image density from 3.0% to less than 5.0%
C: Rate of decrease of image density from 5.0% to less than 8.0%
D: Rate of decrease of image density of 8.0% or higher Fusion of Toner to the Drum Print Durability Test (Evaluation of Image Blank Dots and Image Smearing)

A modified full-color copying machine imageRUNNER ADVANCE C5560 II by Canon Inc. was used as the image forming apparatus. After a durability image output test of 100,000 prints in a high-temperature, high-humidity environment (temperature 30° C./relative humidity 80%, hereafter H/H environment), an evaluation was performed in accordance with the following method. During continuous running of the 100,000 prints, sheets were run under the same developing conditions and transfer conditions (without calibration) as those of the first print. The printing ratio of the durability test image was set to 20%, and developing bias was adjusted so that the initial image density was 1.45. The evaluation paper that was used for outputting the 100,000 prints durability test image was plain copy paper CS-680 (A4, basis weight 68 $g/m^2$, sold by Canon Marketing Japan Inc.).

Once 100,000 prints of durability test image were outputted under the above conditions, a halftone image having an image density of 0.800 was outputted using an X-Rite color reflection densitometer ("500 series", by X-Rite Inc.). Image forming dots become smaller and image density decreases when image smearing and blank dots occur on account of fusion of toner to the surface of the photosensitive member drum; accordingly, a measurement was carried out at 10 sites, and an image density difference thereof (difference between a maximum value and a minimum value) was ascertained.

An evaluation was carried out in accordance with the criteria below; the results are given in Table 7.

Rank AA: Image density difference smaller than 0.025
Rank A: Image density difference from 0.025 to less than 0.050
Rank B: Image density difference from 0.050 to less than 0.075
Rank C: Image density difference from 0.075 to less than 0.100
Rank D: Image density difference of 0.100 or more Hot Offset Resistance Paper: CS-064 (64.0 $g/m^2$)
(sold by Canon Marketing Japan Inc.)
Laid-on level of toner on paper: 0.08 $mg/cm^2$
(adjusted on the basis of the DC voltage VDC of the developer carrier, the charging voltage VD of the electrostatic latent image bearing member, and laser power)
Evaluation image: 2 cm×20 cm image on the long edge of the above A4 paper, in the paper feeding direction, while leaving a margin of 2 mm from the leading end of the paper
Test environment: normal-temperature, low-humidity environment: temperature 23° C./humidity 5% RH (hereafter "N/L")
Fixation temperature: raised from 100° C. in 5° C. increments
Process speed: 300 mm/sec The evaluation image was outputted, and hot offset resistance was evaluated according to the following criteria, according to the highest fixation temperature at which hot offset did not occur.

Evaluation Criteria

A: 140° C. or higher
B: from 130° ° C. to less than 140° ° C.
C.: from 120° ° C. to less than 130° C.
D: from 100° ° C. to less than 120° C.
E: Lower than 100° C.

Examples 2 to 28 and Comparative Examples 1 to 7

Low-temperature fixability, fusion of toner to the drum and hot offset resistance were evaluated in the same way as in Example 1, but herein Two-component developers 2 to 35 were used instead of Two-component developer 1. The evaluation results are given in Table 7.

TABLE 7

| | | | Toner characteristic evaluation | | |
|---|---|---|---|---|---|
| Example No | Toner No. | Two-component developer No. | Low-temperature fixability | Drum fusion | Hot offset |
| 1 | 1 | 1 | AA | AA | A |
| 2 | 2 | 2 | AA | C | A |
| 3 | 3 | 3 | C | AA | A |
| 4 | 4 | 4 | A | AA | A |
| 5 | 5 | 5 | A | AA | A |
| 6 | 6 | 6 | A | A | A |
| 7 | 7 | 7 | A | A | C |
| 8 | 8 | 8 | AA | A | A |
| 9 | 9 | 9 | AA | A | A |
| 10 | 10 | 10 | A | A | B |
| 11 | 11 | 11 | AA | A | C |
| 12 | 12 | 12 | AA | B | C |
| 13 | 13 | 13 | B | AA | A |
| 14 | 14 | 14 | C | AA | A |
| 15 | 15 | 15 | AA | A | C |
| 16 | 16 | 16 | AA | B | D |
| 17 | 17 | 17 | AA | A | B |
| 18 | 18 | 18 | AA | B | B |
| 19 | 19 | 19 | AA | C | D |
| 20 | 20 | 20 | B | AA | A |
| 21 | 21 | 21 | AA | B | B |
| 22 | 22 | 22 | A | A | A |
| 23 | 23 | 23 | A | B | A |
| 24 | 24 | 24 | B | B | A |
| 25 | 25 | 25 | C | B | A |
| 26 | 26 | 26 | B | B | A |
| 27 | 27 | 27 | C | C | A |
| 28 | 28 | 28 | B | B | B |
| C.E. 1 | 29 | 29 | D | AA | A |
| C.E. 2 | 30 | 30 | A | D | D |
| C.E. 3 | 31 | 31 | AA | D | D |
| C.E. 4 | 32 | 32 | A | D | E |
| C.E. 5 | 33 | 33 | AA | D | A |
| C.E. 6 | 34 | 34 | D | A | B |
| C.E. 7 | 35 | 35 | AA | A | E |

In the Table 7, "C.E." indicates "Comparative example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-207914, filed Dec. 26, 2022, and Japanese Patent Application No. 2023-194259, filed Nov. 15, 2023, which are hereby incorporated by reference herein in their entirety.

What is claimed is:

1. A toner comprising a toner particle comprising a binder resin comprising a crystalline resin and an amorphous resin, and a wax, wherein a matrix-domain structure made up of a matrix including the crystalline resin, and domains including the amorphous resin, is present in a cross-sectional observation of the toner under a transmission electron microscope, the crystalline resin has a first monomer unit represented by Formula (1) below;

in a differential curve, which is obtained through differentiation of a temperature-storage elastic modulus curve by temperature, with temperature as a horizontal axis and a common logarithm Log G' of a storage elastic modulus G' as a vertical axis as obtained in a viscoelasticity measurement of the toner, the differential curve has a minimal value P1 in a range of 50 to 70° C., the minimal value P1 being −0.50 to −0.20, and the differential curve has a minimal value P2 in a range of 80 to 120° C., the minimal value P2 being −0.20 to −0.03;

the storage elastic modulus G' of the toner at the temperature of the minimal value P1 is $5.0\times10^5$ to $2.0\times10^7$ Pa; and the storage elastic modulus G' of the toner at the temperature of the minimal value P2 is $1.0\times10^2$ to $1.0\times10^4$ Pa;

(1)

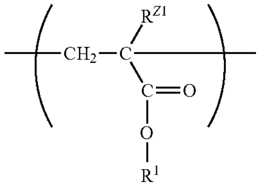

in Formula (1), $R^{Z1}$ represents a hydrogen atom or a methyl group, and $R^1$ represents an alkyl group having 18 to 36 carbon atoms.

2. The toner according to claim 1, wherein with ΔH(T) as a total endothermic quantity J/g per 1 g of wax, derived from the wax, in an endothermic quantity measurement of the toner using a differential scanning calorimeter, and with ΔH(W) as a total endothermic quantity J/g per 1 g of wax, derived from the wax, in an endothermic quantity measurement of the wax, ΔH(T) and ΔH(W) satisfy $0.70\leq\Delta H(T)/\Delta H(W)\leq0.90$.

3. The toner according to claim 1, wherein a content ratio of the first monomer unit in the crystalline resin is at least 30.0 mass %, relative to mass of all monomer units in the crystalline resin.

4. The toner according to claim 1, wherein the amorphous resin is an amorphous polyester resin.

5. The toner according to claim 1, wherein in a cross-sectional observation of the toner under a transmission electron microscope, a number-average diameter of the domains is 0.05 to 3.00 μm.

6. The toner according to claim 1, wherein in a cross-sectional observation of the toner under a transmission electron microscope, a ratio of the domains relative to a combined surface area of the matrix and the domains is 30 to 65 area %.

7. The toner according to claim 1, wherein the crystalline resin contains a second monomer unit represented by Formula (2) below, and a third monomer unit represented by Formula (3) below:

(2)

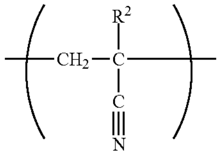

-continued

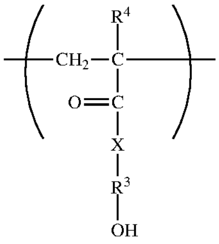

(3)

in Formula (2), $R^2$ represents a hydrogen atom or a methyl group, and in Formula (3), X represents —O— or —NH—, $R^4$ represents a hydrogen atom or a methyl group, and $R^3$ represents an alkylene having 2 to 6 carbon atoms.

8. The toner according to claim 1, wherein the wax is a hydrocarbon wax, and a melting point of the wax is 90° C. or higher.

9. The toner according to claim 1, wherein with SP1 being an SP value $(J/cm^3)^{0.5}$ of the crystalline resin, SP2 being an SP value $(J/cm^3)^{0.5}$ of the amorphous resin, and SP3 being an SP value $(J/cm^3)^{0.5}$ of the wax, the SP1, SP2 and SP3 satisfy the following relationships:

$$2.5 \leq |SP2 - SP1|$$

$$2.5 \leq |SP3 - SP1|.$$

10. The toner according to claim 1, wherein the toner particle comprises an inorganic filler particle, and a content ratio of the inorganic filler particle in the toner particle is 5 to 20 parts by mass, relative to 100 parts by mass of the binder resin.

11. The toner according to claim 10, wherein the inorganic filler particle is treated with a fatty acid.

12. A method for producing the toner according to claim 1, the method comprising:

a melt-kneading step of melt-kneading a mixture that contains the binder resin having the crystalline resin and the amorphous resin, and the wax; and an annealing step of holding a melt-kneaded product obtained after the melt-kneading step at a temperature of 40 to 60° C., for 30 minutes or longer.

* * * * *